(12) United States Patent
Akers et al.

(10) Patent No.: US 8,260,566 B2
(45) Date of Patent: Sep. 4, 2012

(54) APPARATUS AND METHOD FOR RADIOACTIVE WASTE SCREENING

(75) Inventors: Douglas W. Akers, Idaho Falls, ID (US);
Lyle G. Roybal, Idaho Falls, ID (US);
Hopi Salomon, Idaho Falls, ID (US);
Charles Leroy Williams, Pocatello, ID (US)

(73) Assignee: The United States of America, as represented by the United States Deparment of Energy, Washington, DC (US)

( * ) Notice: Subject to any disclaimer, the term of this patent is extended or adjusted under 35 U.S.C. 154(b) by 228 days.

(21) Appl. No.: 12/787,192

(22) Filed: May 25, 2010

(65) Prior Publication Data
US 2011/0295537 A1   Dec. 1, 2011

(51) Int. Cl.
*G06F 19/00* (2011.01)
(52) U.S. Cl. .................................... 702/85; 702/194
(58) Field of Classification Search ............. 702/85, 702/104, 134, 194; 250/252.1, 362, 356.2, 250/393, 395
See application file for complete search history.

(56) References Cited

U.S. PATENT DOCUMENTS

| 3,988,615 | A | | 10/1976 | Umbarger et al. | |
| 5,059,802 | A | * | 10/1991 | Filthuth | 250/374 |
| 5,373,163 | A | * | 12/1994 | Sigg | 250/370.01 |
| 5,514,870 | A | | 5/1996 | Langenbrunner | |
| 6,392,236 | B1 | | 5/2002 | Maekawa et al. | |
| 7,342,231 | B2 | | 3/2008 | Warburton et al. | |
| 2006/0065832 | A1 | * | 3/2006 | Orr | 250/336.1 |
| 2007/0290136 | A1 | | 12/2007 | Ivan | |
| 2008/0249347 | A1 | | 10/2008 | Broda et al. | |
| 2009/0261261 | A1 | | 10/2009 | Rodgers et al. | |

OTHER PUBLICATIONS

U.S. Appl. No. 12/608,775, filed Oct. 29, 2009, entitled, "Apparatuses and Methods for Radiation Detection and Characterization Using a Multiple Detector Probe", to Akers et al.
"Transuranic Radioactive Waste" DOE/NV—787 REV3 Oct. 2007—Department of Energy Nevada Site Office.
"Characterization Protocol for Radioactive Contaminated Soils" Office of Emergency and Remedial Repose Office of Radiation Programs, ANR-458 Publication 9380.1-10FS May 1992.
Hooda et al. "Characterization of Radioactive Hazardous Waste" Journal of Radioanalytical and Nuclear Chemistry, vol. 243, No. 2 (2000) 551-553.
Hughes, M.B. "Successful Characterization of Radioactive Waste at the Savannah River Site" Department of Energy for Waste Management 1995 at Tuscon Feb. 26, 1994-Mar. 2, 1995.

* cited by examiner

*Primary Examiner* — Sujoy Kundu
(74) *Attorney, Agent, or Firm* — Michael J. Dobbs; Daniel Park; John T. Lucas

(57) ABSTRACT

An apparatus and method relating to screening radioactive waste are disclosed for ensuring that at least one calculated parameter for the measurement data of a sample falls within a range between an upper limit and a lower limit prior to the sample being packaged for disposal. The apparatus includes a radiation detector configured for detecting radioactivity and radionuclide content of the of the sample of radioactive waste and generating measurement data in response thereto, and a collimator including at least one aperture to direct a field of view of the radiation detector. The method includes measuring a radioactive content of a sample, and calculating one or more parameters from the radioactive content of the sample.

26 Claims, 13 Drawing Sheets

APPARATUS AND METHOD FOR RADIOACTIVE WASTE SCREENING

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present invention relate generally to radioactive characterization of materials of an environment and, more specifically, to an apparatus and method for screening radioactive materials prior to packaging radioactive waste for certification, shipment, and disposal.

BACKGROUND

For several decades the Department of Energy (DOE), the Environmental Protection Agency (EPA) and other state agencies (e.g., Idaho Department of Environmental Quality) have been involved in clean up of radioactive waste, which has been generated and previously buried as part of nuclear research activities as well as from nuclear weapons production. Such radioactive waste may have resulted from a variety of waste streams, including process waste (e.g., sludge, graphite molds and fines, roaster oxides, and evaporator salts), equipment, and other waste incidental to nuclear research and nuclear weapons production. The radioactive waste may include contaminants such as transuranic isotopes, uranium, and various volatile organic compounds.

Contaminants from buried radioactive waste may leach into the soil and aquifer, which may be hazardous to human health, other life forms, and the environment. As part of the clean-up effort of such contaminants, the buried radioactive waste may be exhumed from pits, repackaged using more secure methods, and transported for further disposal and secured storage. For example, radioactive wastes classified as transuranic may be prepared and transported to the DOE's Waste Isolation Pilot Plant (WIPP) facility located near Carlsbad, N. Mex. for permanent disposal. Other classes of radioactive waste may be sent to other appropriate treatment or disposal facilities, such as Envirocare.

Buried radioactive waste may be excavated and packaged for certification, transport, and disposal. The location of the buried radioactive waste excavation may be referred to herein as a pit or a waste pit. Buried radioactive waste excavation has conventionally required packaging the excavated radioactive waste into drums. After packaging the radioactive waste into drums, the radioactive content of the radioactive waste may be characterized to determine if the packaged radioactive waste in the drums meet certification requirements and waste acceptance criteria for specific disposal facilities (e.g., WIPP, Envirocare), and also to ensure that safety regulations are met for transportation of the radioactive waste.

For example, for disposal of transuranic (TRU) wastes at the WIPP, the drums must be certified by the Environmental Protection Agency (EPA). The EPA must approve the execution of radioactive waste characterization activities before the drums are allowed to be shipped to WIPP for further disposal. A packaged drum may be rejected for certification at a waste disposal facility if the packaged drums are found to not meet appropriate criteria for acceptance to a disposal facility or for transportation. Once packaged, alterations to the radioactive waste may become more difficult, and therefore more costly to ensure acceptance by the disposal facility. For example, a drum that does not meet the acceptance criteria for the WIPP site may require further characterization and may be required to go through treatments, such as, incineration, compaction, thermal treatment, and/or vitrification before the drum can be certified for shipment and disposal at the WIPP site.

In other words, time and money may be wasted if the radioactive content of radioactive waste is too high (i.e., too hot), such that the drums fail to pass the official certification requirements for transportation and acceptance to disposal facilities. Another problem may arise if the radioactive content of the radioactive waste in the packaged drum is radioactive, yet not radioactive enough (i.e., too cool) for certain disposal facilities (e.g., WIPP). In that situation, it may be appropriate to return the radioactive waste to the waste pit, or if disposal is still required, the radioactive waste may be sent to a different disposal facility (e.g., Envirocare rather than WIPP).

Consequently, the inventors have appreciated that there is a need for an apparatus and method for a relatively rapid screening of radioactive waste, and more specifically transuranic waste, prior to packaging, certification, and disposal.

BRIEF SUMMARY

An embodiment of the present invention includes an apparatus for screening radioactive waste. The apparatus comprises a radiation detector configured for detecting radioactivity of a sample of radioactive waste prior to packaging for disposal and generating measurement data in response thereto, a collimator assembly including at least one aperture to direct a field of view of the radiation detector, a computer assembly operably coupled with the radiation detector, and configured to receive measurement data from the radiation detector, and control logic in communication with the computer assembly. The control logic is configured to ensure that at least one calculated parameter based, at least in part, on the measurement data falls within a range between an upper limit and a lower limit.

Another embodiment of the present invention includes a method for screening radioactive waste. The method comprises measuring a radioactive content of a sample of unpackaged radioactive waste, calculating one or more parameters based, at least in part, on the radioactive content of the sample, and ensuring that the one or more parameters fall between a predetermined upper limit and a predetermined lower limit prior to packaging the sample for disposal.

DETAILED DESCRIPTION

Figure 1:
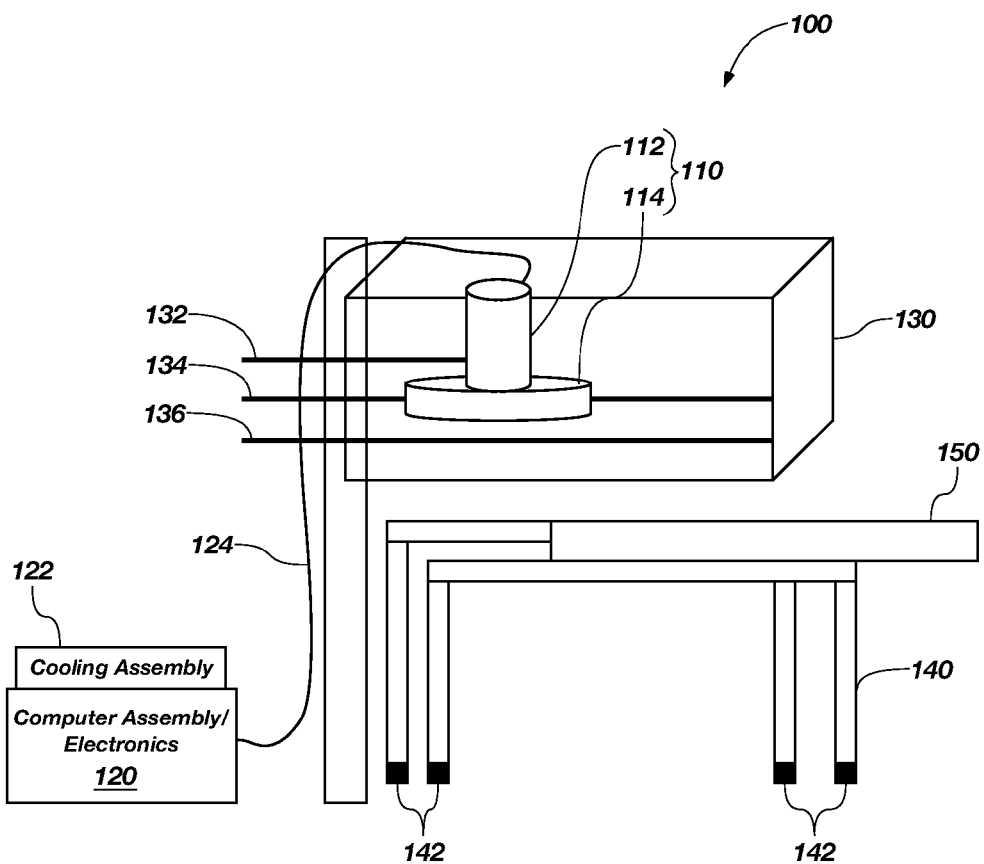
FIG. 1 is a schematic depicting a waste screening system according to an embodiment of the present invention.

In the following detailed description, reference is made to the accompanying drawings which form a part hereof and, in which is shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the present invention in unnecessary detail. Furthermore, specific implementations shown and described are only examples and should not be construed as the only way to implement the present invention unless specified otherwise herein. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

In addition, it is noted that the embodiments and portions thereof may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or a combination thereof. When executed as firmware or software, the instructions for performing the methods and processes described herein may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory. Furthermore, some methods disclosed herein may include human operators initiating commands or otherwise perform functions that may affect components of the system, including selecting instructions when prompted by the software.

Referring in general to the following description and accompanying drawings, various embodiments of the present invention are illustrated to show their structures and methods of operation. Common elements of the illustrated embodiments may be designated with like reference numerals. It should be understood that the figures presented are not meant to be illustrative of limiting views of any particular portion of the structure or method, but are merely idealized representations employed to more clearly and fully depict the present invention defined by the claims below.

Embodiments of the present disclosure relate to screening radioactive waste, and more specifically transuranic waste, which screening may be employed to ensure radioactive waste meets the acceptance criteria of a waste disposal facility, other certification requirements that may exist for transportation of the radioactive waste, or both. To support the effort of waste screening, a waste screening system may be used to estimate radiological parameters before the radioactive waste is packaged (for example, in drums), certified, and shipped out of a drum packaging station (DPS). Some of the radiological parameters estimated by the waste screening system may also be used to support a determination regarding the criticality safety prior to packaging and shipment. The waste screening system may provide a radiological characterization (e.g., transuranic measurements) of the radioactive waste in a relatively minimal amount of time (e.g., may be less than a minute). As used herein, the terms "package," "packaged" and "packaging" as applied to radioactive waste, means and encompasses containment structure for receiving and substantially permanently storing such waste and the placement of such waste in a containment structure for substantially permanent storage thereof.

In other words, the waste screening system may provide data substantially in real-time for waste screening decisions prior to packaging and shipment. For example, a waste screening system may be configured for screening the radioactive waste prior to packaging, characterization, and shipment of the radioactive waste, and for ensuring that the radioactive waste has desired radiological parameters within a predetermined range. Desired radiological parameters may include radioactivity counts, Fissile Gram Equivalent (FGE), transuranic (TRU), and Plutonium Equivalent Curies (PEC), and other like parameters.

FIG. 1 is a schematic of a waste screening system 100 according to an embodiment of the present invention. Waste screening system 100 includes waste screening assembly 110 and computer assembly/electronics 120. Waste screening assembly 110 includes a radiation detector 112 and a collimator 114. The radiation detector 114 is configured for detecting radioactivity of a sample of potentially radioactive waste (hereinafter referred to as a "sample") and generating measurement data in response thereto. The collimator 114 includes at least one aperture to direct a field of view of the radiation detector 114. The computer assembly/electronics 120 is operably coupled with the radiation detector 114, and configured to receive measurement data from the radiation detector 114. Line 124 represents data cables, which may operably couple the radiation detector 112 and the computer assembly/electronics 120 for data transfer between radiation detector 112 and computer assembly/electronics 120. One skilled in the art will recognize that radiation detector 112 may optionally be operably coupled with computer assembly/electronics 120 through wireless communication protocols, such as WiFi, Bluetooth, zigbee, and the like, in lieu of the use of cables.

Line 124 may also generally represent a tube (e.g., hose) for a cooling assembly 122 to communicate cooling fluids to the radiation detector 112. It is noted that cooling assembly 122 and computer assembly/electronics 120 are shown in FIG. 1 as being located near each other, as if at the same location; however, locating the cooling assembly 122 and computer assembly/electronics 120 near each other is shown for simplicity and not as a physical limitation. Thus, although line 124 may generally refer to both data cables and cooling fluid tubes, data cables and cooling fluid tubes may be routed separately to different locations of cooling assembly 122 and computer assembly/electronics 120.

Waste screening system 100 may further include a protective enclosure 130 surrounding at least a portion of waste screening assembly 110 configured to provide a barrier from outside contaminants (e.g., airborne contaminants) adversely affecting the radiation detector 112. Protective enclosure 130 may be formed from a wide variety of materials, such as plastics. For example, protective enclosure 130 may be formed from a polycarbonate resin thermoplastic which may manufactured under the trade name LEXAN®, by SABIC Innovative Plastics of Pittsfield, Mass.

Waste screening system 100 may also include a support structure 140 configured to receive and support a temporary waste container 150 in a position suitable for alignment with waste screening assembly 110. The temporary waste container 150 may be configured to hold the sample. The support structure 140 may receive the sample directly on a platform or conveyor belt in a position for alignment with the waste screening assembly. As a result, support structure 140 may be configured as a lift table, a conveyor system, or other measurement platform. Support structure 140 may further include weight measurement devices. For example, as shown in FIG. 1 such weight measurement devices may be load cells 142. Load cells 142 or other weight measurement devices may determine a weight of the sample, which weight may be further used in analysis, such as to calculate density of the sample within temporary waste container 150.

Additionally, temporary waste container 150 may include depth measurement devices (not shown) which may be configured for measuring or estimating depth of the sample within temporary waste container 150. Examples of such depth measurement devices may include sensors configured for measuring depth, or may be as simple as a ruler displayed on the temporary waste container 150, from which an operator may visually estimate the depth of the sample in temporary waste container 150. Another method for measuring the depth of the sample may include a laser-based system.

One or both of the estimated depth and weight measurements may be used in the analysis regarding the calculation of radiological parameters within the sample. For example, with knowledge of the depth of the sample, the dimensions of the temporary waste container 150, and the weight of the sample, volume and density of the sample may be determined.

In some embodiments, waste screening system 100 may include tracks 134, 136 configured to permit movement (e.g., sliding) of waste screening assembly 110 in a plane aligned with a desired position for the temporary waste container 150. Movement of the waste screening assembly 110 may be performed by an operator with the assistance of an operator handle 132 coupled with the waste screening assembly 110.

The radiation detector 112 may include a radiation detector configured for spectral analysis of a variety of different radiation emitters. For example, radiation detector 112 may be configured to measure one or more transuranic and fissile products such as $^{238}Pu$, $^{239}Pu$, $^{240}Pu$, $^{241}Pu$, $^{242}Pu$, $^{233}U$, $^{235}U$, $^{137}Cs$, and other radionuclides such as $^{237}Np$ and $^{60}Co$. Other radionuclides may also be detected and be reported.

Radiation detector 112 may be a germanium detector; however, other detector types may be used.

Radiation detector 112 is not limited to a single radiation detector, or to one detector type. For example, radiation detector 112 may include one or more radiation detectors, such as is described in, for example, U.S. patent application Ser. No. 12/608,775, which was filed on Oct. 29, 2009 and entitled Apparatuses and Methods for Radiation Detection and Characterization Using a Multiple Detector Probe, the disclosure of which is incorporated herein in its entirety by this reference. Radiation detector 112 may also be selected for specific radiation types, such as low-energy beta particle emitters, such as is described in, for example, U.S. patent application Ser. No. 12/683,904, which was filed on Jan. 7, 2010 and entitled Method, Apparatus and System for Low-Energy Beta Particle Detection, the disclosure of which is incorporated herein in its entirety by this reference.

The collimator 114 may include one or more apertures configured to direct a field of view (FIG. 2) for radiation detector 112 to detect radioactivity from the sample within temporary waste container 150. The configuration of collimator 114 may be related to the dimensions of the temporary waste container 150, as well as the performance characteristics (e.g., resolution) of the radiation detector 112. The collimator 114 may include a rotatable portion, which may permit the waste screening system 100 to include a plurality of modes of operation. The rotatable portion may align apertures or block apertures, which may alter, or in some cases eliminate, the field of view of the radiation detector 112 relative to the external area of the collimator 114. The plurality of modes permitted by the collimator 114 is described more fully below with reference to FIGS. 9 through 11C. The collimator 114 may be formed from a metal or a metal alloy. For example, collimator 114 may comprise aluminum. For some of the modes of the waste screening system 100, the rotatable portion of the collimator 114 may be structured to shield the radiation detector 112 from radiation. Accordingly, the collimator 114 may include a high Z material to act as a shield in positions which are to align with the radiation detector 112 during the appropriate modes of operation. High Z materials may include, for example, bismuth, lead, and tungsten.

Computer assembly/electronics 120 may include devices for receiving and analyzing data from the waste screening assembly 110, and specifically from the radiation detector 112. Such devices may include multichannel analyzers, analog-to-digital converters, pulse counters, amplifiers, and so forth. Computer assembly/electronics 120 may further include input devices such as a mouse, keyboard and other input devices through which an operator may input information, operate the computer assembly/electronics 120 or electronically operate other functions of the different components of the waste screening system 100. Computer assembly/electronics 120 may further include output devices or other peripheral devices such as monitors, printers, speakers, and so on, from which an operator may interpret results of measurements, characterization of the measurements, the operational status of different components of waste screening system 100, or other similar outputted information. Computer assembly/electronics 120 may further include storage media such as hard drives, external hard drives, flash memory, RAM, ROM, DVDs, and other computer-readable media for storing information related to measurements or status of components of the waste screening system 100.

Computer-readable media, such as storage media, may also be used for executing instructions and functions related to performing, analyzing and characterizing such measurements or controlling components within the waste screening system 100. In other words, computer assembly/electronics 120 includes control logic (not shown) which may include instructions that permit waste screening system 100 to function. For example, the control logic may be configured to ensure that at least one calculated parameter from the measurement data is within a range between an upper limit and a lower limit prior to the sample being packaged for disposal. The control logic may also include a user interface, which may provide operators with prompts and directions for simplified operation for inexperienced operators. The control logic may also include instructions for other functions such as automated calibration, data acquisition, analysis, and data storage. At least some of these functions are described below.

As previously stated, line 124 may generally represent a tube (e.g., hose) configured to communicate cooling fluids from cooling assembly 122 to the radiation detector 112. Certain types of radiation detectors (e.g., semiconductor detectors), which may be included in radiation detector 112, may achieve better performance (e.g., better resolution, more accuracy, etc.) during detection when the radiation detector 112 is sufficiently cooled. Cooling assembly 122 may include a mechanical cooling device (e.g., a compressor) which cools a fluid to a suitable cooled temperature for a particular radiation detector. A non-limiting example of such a cooling device is an X-Cooler device, which is available in the ORTEC® product line from Advanced Measurement Technology, Inc. of Oak Ridge, Tenn. Cooling assembly 122 may alternatively provide fluids of an already sufficiently chilled temperature (e.g., liquid nitrogen).

Waste screening system 100 may be located on-site, such as the location (e.g., waste pit) from which contaminated soil may be exhumed to be screened and potentially packaged for shipment and/or disposal thereof. In some circumstances (e.g., locations of overly high gamma-radiation fields, or simply for preference), it may be desirable to remotely operate waste screening system 100. Therefore, waste screening system 100 may be locally operated by an operator, remotely operated by an operator, automated, or any combination thereof.

In operation, a sample of potentially radioactive material may be placed within temporary waste container 150 for further processing. In other words, a temporary waste container 150 may be received by waste screening system 100 for detection and analysis of the radioactive content of the sample within the temporary waste container 150. Obtaining the sample through excavation of a waste pit may be one source for obtaining the sample to be placed in the temporary waste container 150 for analysis. One of ordinary skill in the art will recognize that any sample may be analyzed by the waste screening system 100 for the sample's radioactive content regardless of the origin of the sample. For purposes of providing an example, an excavated sample may be used in describing at least some of the exemplary embodiments of the present disclosure. The sample may, for example, include process waste (e.g., sludge, graphite molds and fines, roaster oxides, and evaporator salts), equipment, and other waste incidental to nuclear research and nuclear weapons production. The sample may also include raw materials (e.g., rock, dirt, etc.) which may be contaminated due to radioactive contaminants present in the waste pit. Thus, in general a sample may include a relatively large volume of loose unpackaged materials (e.g., debris) that may include radioactive contaminants.

Temporary waste container 150 is shown in FIG. 1 as a tray configuration; however, other configurations and shapes (e.g., bags, bottles, etc.) may be suitable for modified configurations of waste screening system 100. The temporary waste container 150 may be configured to hold a sample of a quantity similar to the quantity of material held by a permanent disposal container. For example, 55-gallon drums are often used as permanent disposal container. As a result, the temporary waste container 150 may be configured to hold a sample of approximately 55 gallons of material.

The waste screening system 100 may be used to provide initial estimates of at least one of the following calculated parameters: radioactivity counts, FGE, TRU, and PEC content in the sample within temporary waste container 150. The initial estimates are performed prior to the sample being placed into a drum packaging station for further packaging, certification, disposal, and storage. The initial estimates may be the basis for ensuring that the desired parameters (e.g., FGE and PEC) lie within a range between a selected upper limit and a selected lower limit. The initial estimates for the measurements may further include uncertainty data (e.g., random and systematic) in order to provide assurance that the parameters may not fall outside of desired limits. The initial estimates may include individual data for when the sample is packaged in an individual permanent disposal container (e.g., drum). The initial estimates may include collective data, such as for the summed quantity of the parameters when the sample is collectively disposed (e.g., standard waste box) with multiple samples. For example, an upper limit for FGE may include 200 g. FGE if a sample is packaged in a drum, and a summed total of 325 g. FGE for samples packaged a standard waste box.

If the waste screening system 100 indicates that the sample exhibits a radiation level between a lower limit (e.g., 100 nCi/g) and an upper limit (e.g., 200 nCi/g) for a given parameter, the sample may be packaged and disposed of at a facility (e.g., WIPP) that accepts radioactive waste exhibiting such radiation levels. If the sample exhibits a radiation level higher than the upper limit (e.g., 200 nCi/g) for a given parameter, the sample may similarly be remediated or disposed of in an appropriate manner. If the sample exhibits a radiation level falling below the lower limit (e.g., 100 nCi/g), the sample may still have a radiation level that would require packaging and disposal at some other facility (e.g., Envirocare) that accepts radioactive waste with such radiation levels. In some situations, it may be possible to take steps to alter (i.e., raise or lower) the radiation levels of the sample to fall within the desired radiation levels. Steps used to alter the radiation levels may include remediation of the sample or blending the sample with another sample prior to final packaging and certification. If the exhibited radiation level of the sample is sufficiently low enough, the sample may not require remediation, packaging, disposal, further storage, or any combination thereof. In such circumstances, the sample may possibly be returned to the waste pit. Details regarding the analysis used for the above determinations regarding the radiation levels of the sample are described herein with reference to FIGS. 6 through 11C.

If the radiation levels of the sample are such that packaging and disposal of the sample would be appropriate, the sample may be removed from the temporary waste container 150 and packaged in a permanent disposal container (e.g., drum). Moving the sample from the temporary waste container 150 to a permanent disposal container may affect the levels of uncertainties for the measurements taken by the waste screening system 100. The effects on uncertainties may be caused by the different geometries of the different containers. For example, the temporary waste container 150 may be configured as a tray, which would have a different geometry from a drum used for permanent disposal. As a result, for certification of the drum, a certification system may be configured to make a more rigorous set of measurements regarding the radiation levels of the sample in the permanent disposal container, with the analysis taking into account the final geometries of the sample in the permanent disposal container.

Figure 2A:
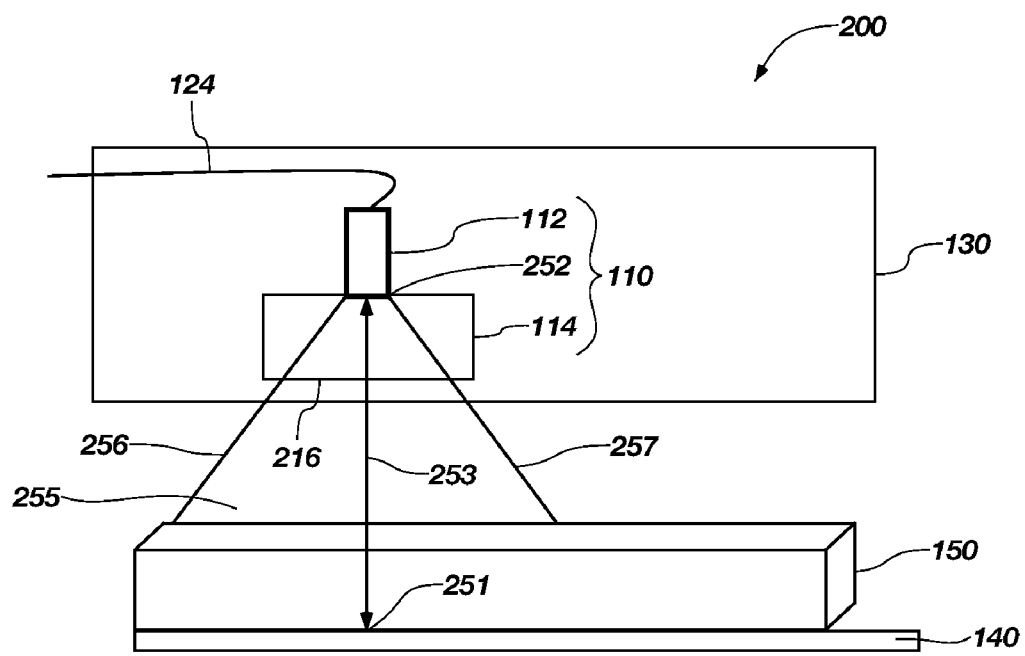
FIG. 2A is another schematic view of a waste screening system according to an embodiment of the present invention.

FIG. 2A is another schematic view of a waste screening system 200 according to an embodiment of the present invention. Waste screening system 200 includes waste screening assembly 110, which includes radiation detector 112 and collimator 114. Waste screening system 200 includes protective enclosure 130 and support structure 140. As previously discussed, line 124 may generally refer to the data cables which may operably couple the radiation detector 112 to computer assembly/electronics (FIG. 1) for data transfer between radiation detector 112 and computer assembly/electronics. Line 124 may also generally represent a tube (e.g., hose) for cooling assembly (FIG. 1) to communicate cooling fluids to radiation detector 112, if needed or desired for performance of particular radiation detectors used as radiation detector 112.

FIG. 2A also shows the collimator 114 and temporary waste container 150 geometry according to an embodiment of the present invention. As indicated, temporary waste container 150 may be located at a distance 253 used to minimize count times to improve the ability of the waste screening system 200 to reliably measure a count limit for a lower limit (e.g., 100 nCi/g) in a relatively short amount of time. Distance 253 may be measured from the bottom 251 of the temporary waste container 150 to the interface 252 between radiation detector 112 and collimator 114. An exemplary distance 253 is 18 inches for a collimator 114 with a depth of 4 inches.

An aperture 216 of collimator 114 aligns with the radiation detector 112 to direct the field of view 255 (defined between lines 256 and 257) of the radiation detector 112 to permit the radiation detector 112 to detect the radioactivity of the sample and reduce or eliminate the effects of radioactivity from background sources (e.g., a nearby pit, other filled temporary waste containers awaiting screening, packaged drums, etc.). For example, the dimensions of the aperture 216, the temporary waste container 150, or both, may be modified such that the field of view 255 of the radiation detector 112 extends to align substantially with each of the edges of temporary waste container 150 while restricting the view of the radiation detector 112 from viewing the area outside of the edges of the temporary waste container 150. Restricting the field of view 255 of the radiation detector 112 from viewing the area outside of the temporary waste container 150 may be desirable in keeping the measurements restricted to the sample in the temporary waste container 150 rather than from the surrounding area.

The field of view 255 of the radiation detector 112 may be modified by the aperture 216 of the collimator 114 to view a reduced portion of the temporary waste container 150 (e.g., about one half) to improve accuracy and resolution of the measurements collected on the sample in the temporary waste container 150 by the radiation detector 112. As shown in FIG. 2A, the field of view 255 of the radiation detector 112 through aperture 216 of collimator 114 may be substantially smaller than the dimensions of the temporary waste container 150. In such a situation, it may be necessary to take more than one measurement to obtain a full screening of the sample within temporary waste container 150. For example, while the field of view 255 for a desired distance 253 and resolution of radiation detector 112 may be approximately half the size of the temporary waste container 150—which may require at least two measurements for a full screening of the sample.

In an embodiment where the field of view 255 of the radiation detector 112 is smaller than the temporary waste container 150, a measurement can be made for the first portion of the temporary waste container 150. If the activity of the first portion of the temporary waste container 150 is sufficiently within the desired limits, measurements for the second portion of the temporary waste container 150 may be omitted. If more than one measurement is made, the multiple measurements may be averaged in order to arrive at a composite (i.e., total) activity level for the contents of the temporary waste container 150. Further description regarding process and analysis of the contents of the temporary waste container 150 is described with respect to FIGS. 11A-11C.

Figure 2B:
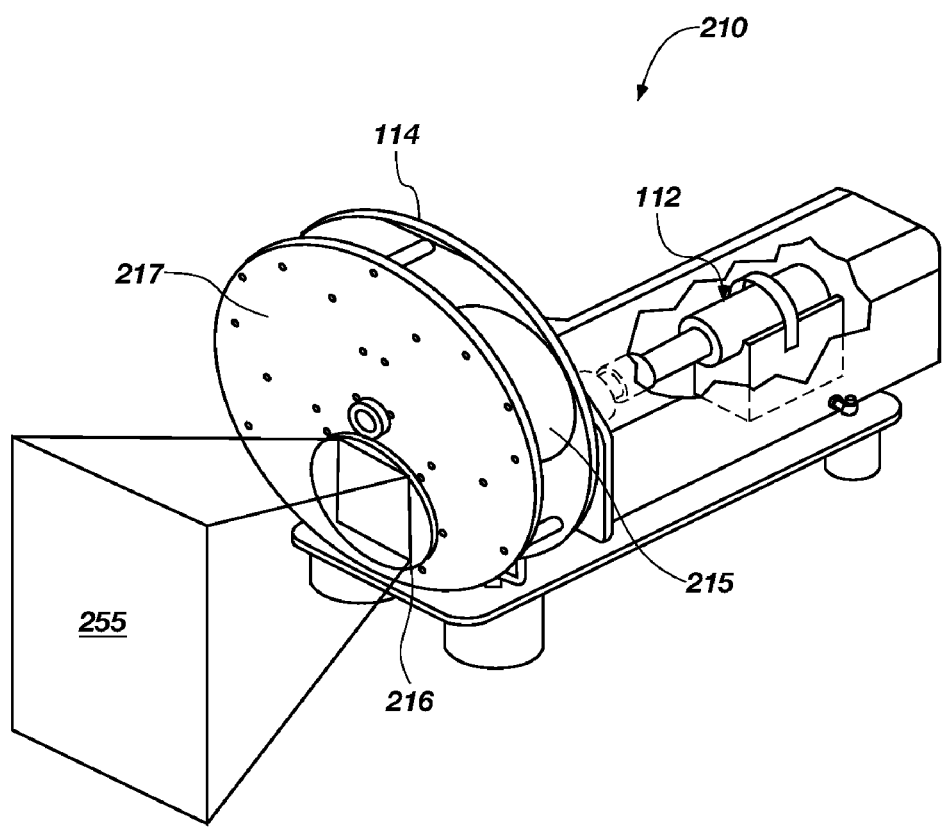
FIG. 2B is a schematic of a waste screening assembly according to an embodiment of the present invention.

FIG. 2B is a schematic of a waste screening assembly 210 according to another embodiment of the present invention. The waste screening assembly 210 includes a radiation detector 112 and collimator 114. The collimator 114 may include an aperture 216 which may align with the radiation detector 112 to direct the field of view 255 to permit the radiation detector 112 to detect the radioactivity of the sample in a temporary waste container (FIG. 2A). The collimator 114 may be configured to rotate in order to allow a waste screening system (FIG. 2A) to operate in multiple modes. For example, the collimator 114 may rotate such that one of sections 215 or 217 may align with the radiation detector 112. Sections 215 and 217 may include shielding the radiation detector 112 from the sample in order to block the radiation detector 112 and reduce or even eliminate the field of view 255. In other words, the collimator 114 is configured to align apertures or block apertures, which may alter, or in some cases eliminate, the field of view 255 of the radiation detector 112 relative to the external area of the collimator 114. Blocking the radiation detector 112 from an external field of view 255 may be desirable during a source check mode or a shielded background check mode, while allowing a field of view 255 may be desirable for an assay mode.

The assay mode operates in conjunction with an assay measurement function, such that one or more apertures 216 of collimator 114 align with radiation detector 112 to direct a field of view 255 for the radiation detector 112 to detect the radioactivity of a sample. In other words, the collimator 114 is aligned with the radiation detector 112 to permit the radiation detector 112 to view the sample within a temporary waste container. The assay mode is described more fully below with reference to FIGS. 11A-11C.

During the background check mode of operation, the collimator 114 may be rotated and aligned to the proper position to perform a shielded background check function. A portion (e.g., 217) of the collimator 114 may be used to align with and shield the radiation detector 112 from external radiation in order to perform internal checks for contamination within the radiation detector 112 itself. A background check may also be referred to herein as a "shielded background check" or a "shielded check," and are described more fully below with reference to FIG. 10.

The source check mode operates in conjunction with a source check function. The source check function performs an energy calibration the radiation detector 112 with a known source (e.g., $^{152}$Eu). When rotated to the source check position, the collimator 114 may shield the radiation detector 112 from background activity and position a known source (e.g., $^{152}$Eu) placed laced within a portion (e.g., 215) of the collimator 114 to be viewed by the radiation detector 112. The source check mode is described later with reference to FIG. 9.

Figure 3A:
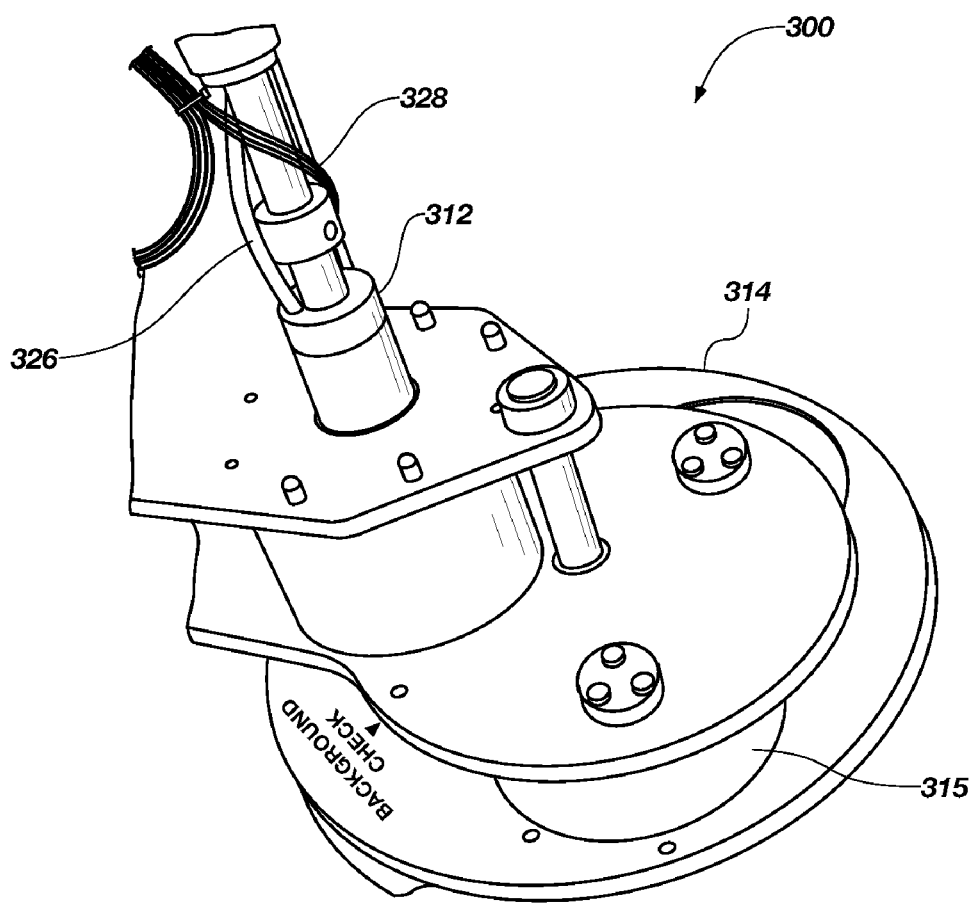
FIGS. 3A and 3B are schematics representing photographs of portions of waste screening assemblies according to an embodiment of the present invention.
Figure 3B:
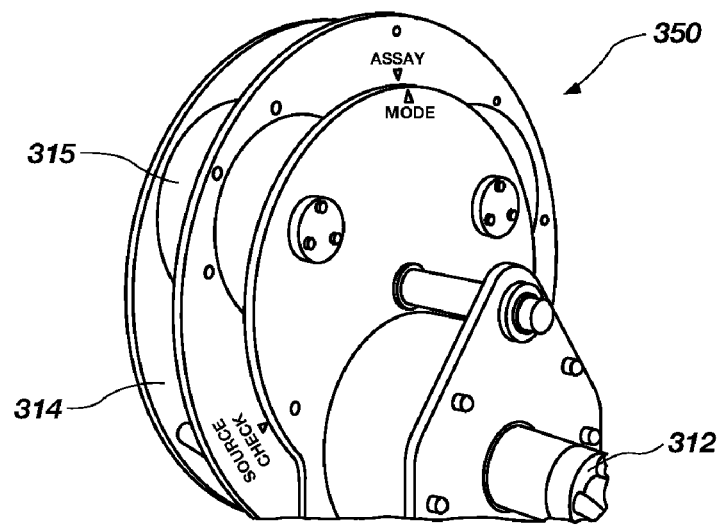

FIGS. 3A and 3B are schematics representing photographs of portions of waste screening assemblies 300, 350 according to an embodiment of the present invention. Waste screening assemblies 300, 350 include a radiation detector 312 and a collimator 314.

FIG. 3A shows a waste screening assembly 300 oriented to have a field of view extending axially from the radiation detector 312 in a vertical direction such that the waste screening assembly 300 may be located above a temporary waste container. FIG. 3B shows a waste screening assembly 350 oriented to have a field of view extending axially from the radiation detector 312 in a horizontal direction such that the waste screening assembly 350 may be located to the side of a temporary waste container.

As previously discussed, the collimator 314 may be configured to permit a waste screening system to operate in multiple modes. The collimator 314 may, therefore, include a rotatable portion to align apertures or block apertures, which may alter, or in some cases eliminate, the field of view of the radiation detector 312 relative to the external area of the collimator 314. For example, FIG. 3A shows an indicated position for one mode of operation, "Background Check." FIG. 3B shows indicated positions for two modes of operation, "Assay," and "Source Check."

As further shown in FIG. 3A, cooling tube 326 is operably coupled with radiation detector 312 to communicate cooling fluids to radiation detector 312 from a cooling assembly (not shown). Data cables 328 are likewise operably coupled with the radiation detector 312 to transmit data between radiation detector 312 and computer assembly/electronics (not shown).

Figure 4A:
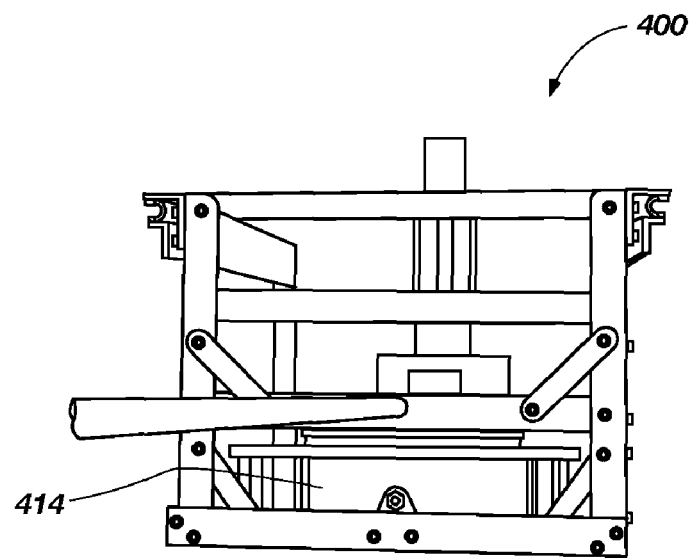
FIGS. 4A and 4B are schematics representing photographs of portions of waste screening systems according to an embodiment of the present invention.
Figure 4B:
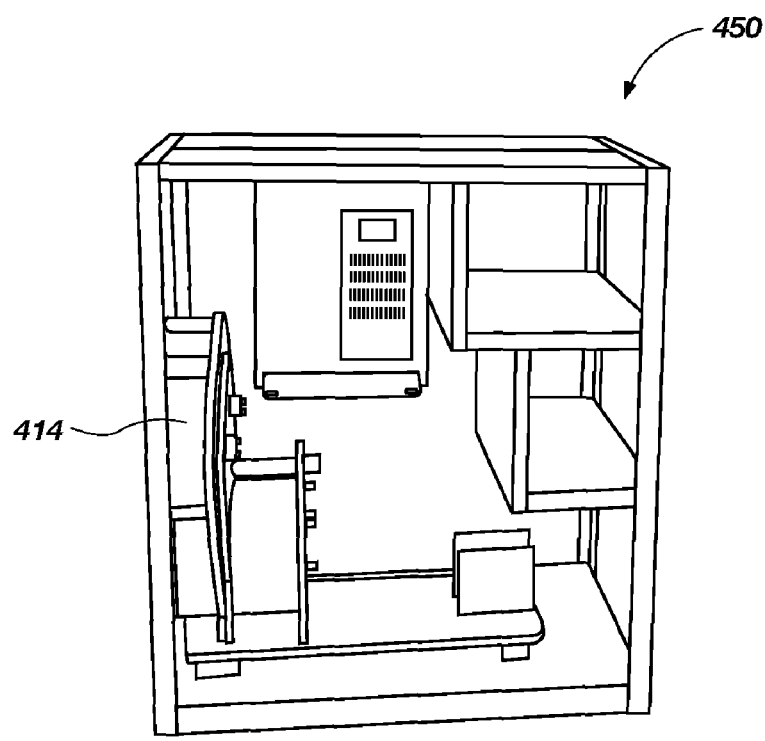

FIGS. 4A and 4B are schematics representing photographs of waste screening systems 400, 450 according to an embodiment of the present invention. Waste screening systems 400, 450 may further include one or more of the components and devices as in other embodiments described herein; however, view of such other components and devices may be obstructed. For this reason, reference numerals for individual components have been omitted from FIGS. 4A and 4B, with the exception being collimator 414.

In operation, a radiation detector may detect radiation emitted from contaminants within the sample in a temporary waste container. The radiation detector may have a field of view that may be directed by an aperture of a collimator 414. The collimator 414 may be configured to be rotated in order to permit the waste screening systems 400, 450 to operate in multiple modes. As shown in FIG. 4A, the collimator 414 may be configured such that an aperture thereof aligns with the central axis of a radiation detector. The field of view for the radiation detector may extend axially from the radiation detector in a vertical direction, such that the waste screening assembly may be positioned above a temporary waste container. As shown in FIG. 4B, the collimator 414 may be configured such that an aperture thereof aligns with the central axis of a radiation detector. The field of view for the radiation detector may extend axially from the radiation detector in a horizontal direction, such that the waste screening assembly may be positioned to the side of a temporary waste container.

One skilled in the art will recognize that modifications may be made such that the field of view may be vertical, horizontal, or angular relative to a radiation detector, and that a waste screening assembly may be located above, below, to the side, or at an angle relative to the temporary waste container. Such modifications may affect the complexity of calculations during detection and analysis, and in some cases may affect accuracy and performance of the waste screening system.

Embodiments of the present disclosure may also include methods for screening radioactive waste. Such methods may include method for screening radioactive waste, measuring a radioactive content of a sample, calculating one or more parameters from the radioactive content of the sample, and ensuring that the one or more parameters fall between an predetermined upper limit and a predetermined lower limit prior to packaging the sample for disposal.

Figure 5:
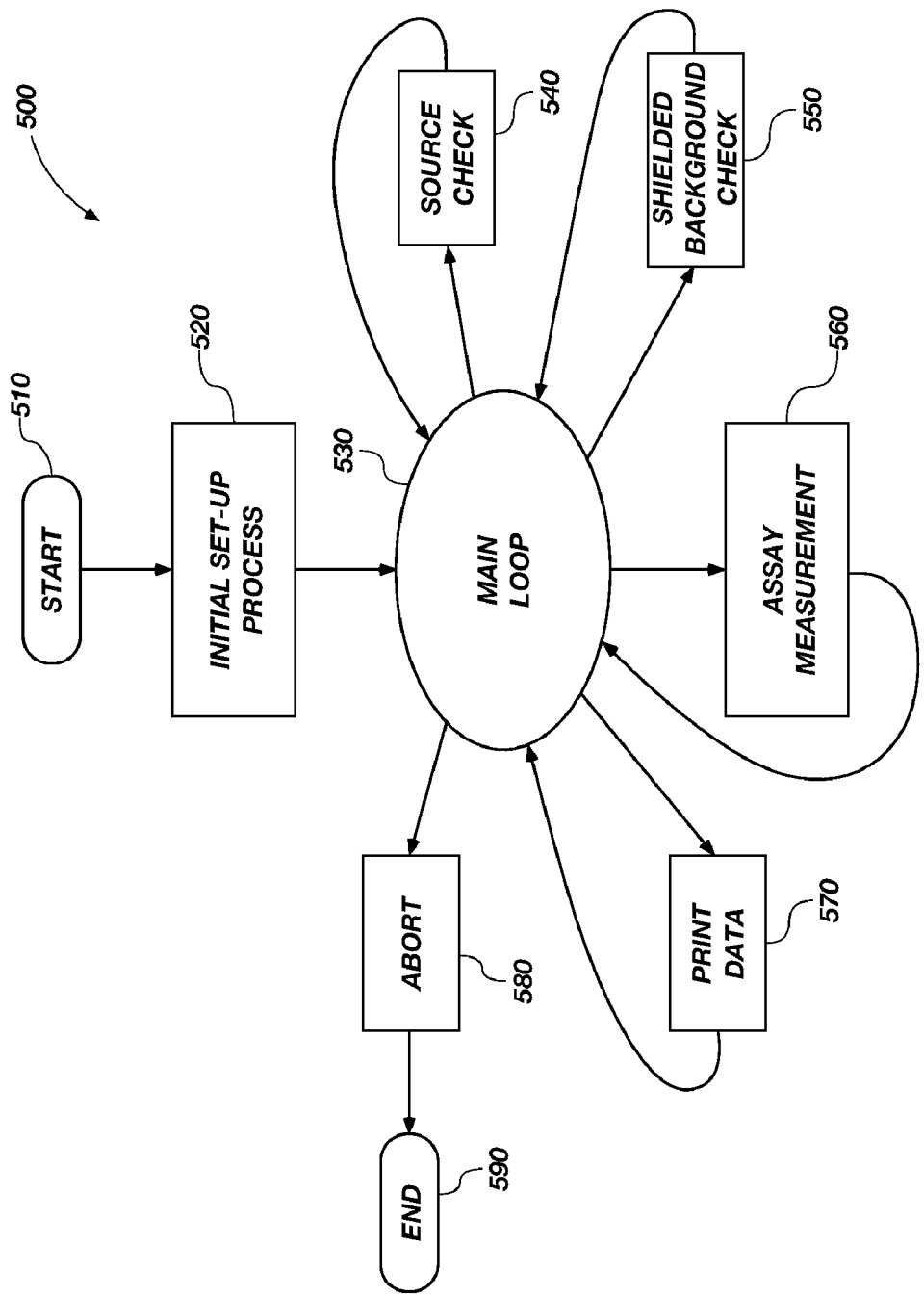
FIG. 5 is a hierarchical view of processes for operating a waste screening system according to an embodiment of the present invention.

FIG. 5 is a hierarchical view of processes 500 for operating a waste screening system according to an embodiment of the present invention. Processes 500 may be initiated by waste screening system software being launched. For example, a waste screening system software icon may be located on the desktop of a computer. An operator may press the waste screening system software icon. The processes 500 for operating a waste screening system begin at operation 510 which initiates an initial set-up process 520. From an initial set-up process 520, a main loop 530 is entered. From the main loop 530, one or more functions may be performed. Performance of such functions may be initiated manually by an operator, automatically according to a minimum time interval between occurrences of certain events, automatically according to certain events being triggered (i.e., interrupted) during execution of the main loop 530, or any combination thereof.

Exemplary functions may include a source check function 540, shielded background check function 550, assay measurement function 560, or a print container usage function 570. Each function may be called and executed, after which execution the main loop 530 may continue to execute. An abort function 580 may be called, which function terminates the main loop 530 and ends the program at operation 590. Other functions may likewise have features for termination of the program if certain situations occur or problems are detected.

More or fewer functions may also exist in addition to, or in place of, certain functions shown herein. Further details regarding several of these functions are described below. For example, an exemplary initial set-up process 520 is described with reference to FIG. 7. An exemplary main loop 530 is described with reference to FIG. 8. An exemplary source check function 540 is described with reference to FIG. 9. An exemplary shielded background check function 550 is described with reference to FIG. 10. An exemplary assay measurement function 560 is described with reference to FIGS. 11A-11C.

The waste screening system software may include a user interface for interaction with the operator. For example, the user interface may be a menu-driven graphical user interface (GUI) for ease of use and control by an operator. The user interface may perform functions automatically, through a virtual push-button interface on the computer screen, or through a combination thereof. The user interface may include pop-up windows that present options regarding system configuration or operating parameters the operator can choose from to customize the assay measurement. The user interface may also include pop-up windows that communicate advisory information and directions to the operator.

The processes 500, in addition to functions related to the processes described below, are to be viewed as examples of processes and functions that may be provided by a waste screening system. Other functions may be provided, in addition to, or in the place of the processes and functions described herein. Before moving on to describing individual functions that may be performed, it may be useful to first describe a background measurement function, which may be a common sub-function to many of the individual functions described herein.

Figure 6:
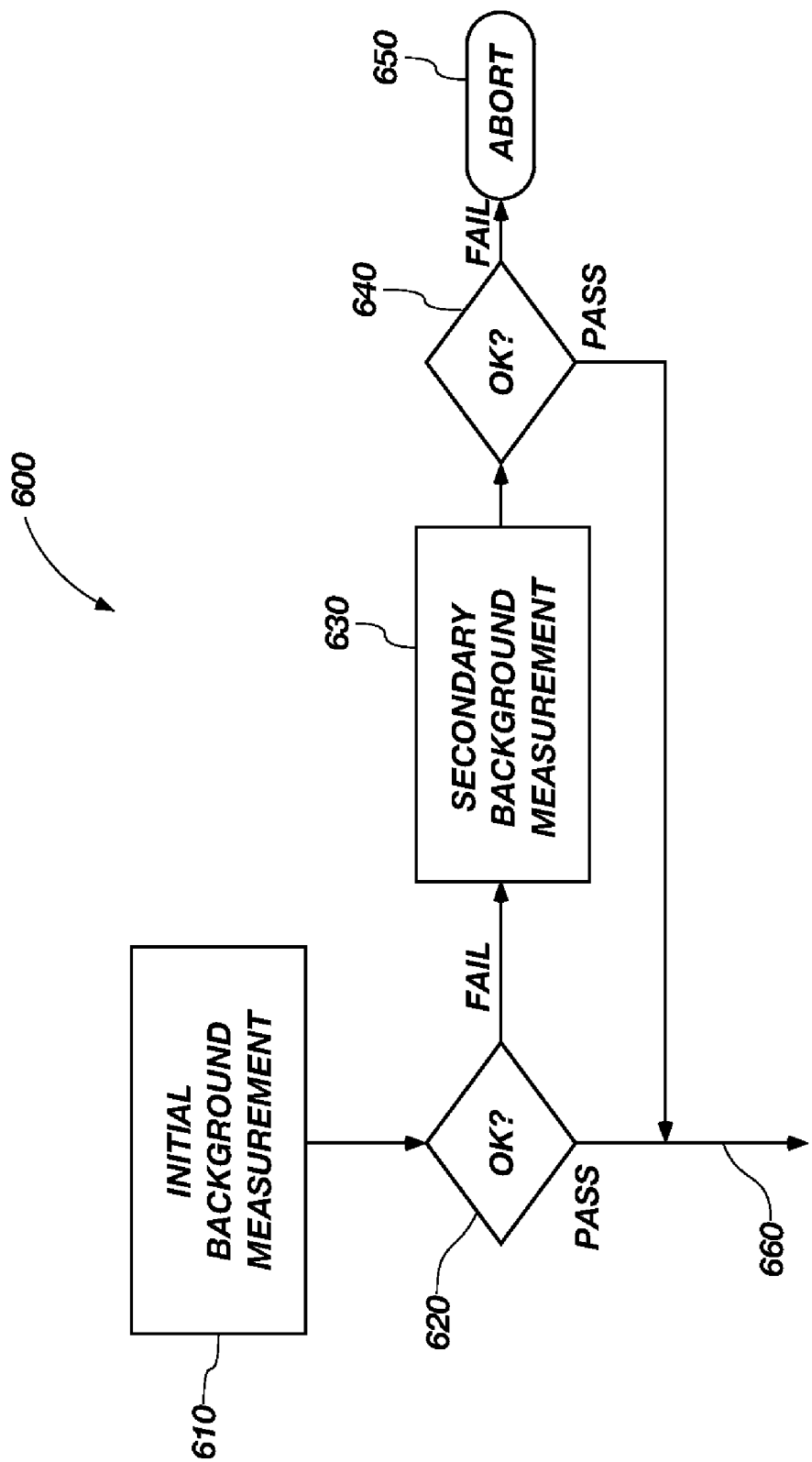
FIG. 6 is a flow chart representing a background measurement of a waste screening system according to an embodiment of the present invention.

FIG. 6 is a flow chart representing a background measurement 600 function of a waste screening system according to an embodiment of the present invention. Background measurement 600 may be performed at various times in various functions during the different modes of analysis and operation. For example, background measurements may be performed during an initial start-up process (FIG. 7), during a source check function (FIG. 9), during a shielded background check function (FIG. 10), during an assay measurement function (FIGS. 11A-11C). As such, a detailed example of a background measurement is not repeated for each of the above functions, but given with reference to the various operations, which may occur as shown in FIG. 6.

At operation 610, an initial background measurement is performed. The initial background measurement at operation 610 may include a gross background count of the area surrounding the waste screening system (e.g., a nearby pit, radiation in air, etc.) which may be result in background detected by the radiation detector. Such an initial background measurement may ensure that substantial changes have not occurred in the area surrounding the waste screening system over a relatively short period of time. Such an initial background measurement at operation 610 may improve safety for human operators of the waste screening system, as well as improve accuracy of the assay measurements. Initial background measurements from operation 610 may be a gross gamma radiation measurement of the background and may not necessarily monitor specific energy lines. However, initial background measurements from operation 610 may also monitor count rate on one or more specific energy lines from a range of radionuclides (e.g., $^{137}$Cs, $^{60}$Co, $^{235}$U, $^{238}$U, $^{239}$Pu, $^{240}$Pu, $^{241}$Am, etc.) to create a control chart to track the contamination of the background over time. A control chart may include historical data, which may assist an operator in assessing changes in system performance over time.

As described herein, source checks and shielded background checks may also generate similar control charts. The control charts may be stored in one or more files (e.g., ASCII text file), which may be used to graphically construct the history of the radiation detector with respect to background spectra, source check spectra, and shielded background spectra. The source control chart files have different content compared to the background and shielded background control chart files. For example, the source check control charts may include count rate data from all five $^{152}$Eu lines used in the source check. The background control chart may include count rate data from a relatively small sampling of radionuclides, including $^{241}$Am, $^{239}$Pu $^{235}$U, $^{60}$Co, and $^{137}$Cs.

At operation 620, if the initial background measurement from operation 610 is acceptable (i.e., changes in the background radiation is within an acceptable limit), the background measurement 600 passes and moves on to whatever operation is next. Line 660 is left open-ended as a further operation may be highly variable depending on the overall function that background measurement 600 is a part of.

If the initial background measurement from operation 610 fails at operation 620 (i.e., changes in the background radiation is not within an acceptable limit), the initial background measurement from operation 610 fails and moves onto a secondary background measurement at operation 630. Secondary background measurement at operation 630 may be substantially similar in purpose and function as initial background measurement of operation 610. However, secondary background measurement of operation 630 is generally performed for a longer duration in order to obtain a more accurate reading of the background counts to ensure that the failure at operation 620 was appropriate. If after the secondary background measurement of operation 630 the changes in the background radiation are still determined unacceptable at operation 640, the operation of the waste screening system is aborted at operation 650 until appropriate measures are taken to fix the cause of the unacceptable background radiation. If the measurements from the longer secondary background measurement of operation 630 yields more acceptable results than the failure of the initial background measurement of operation 610, then at operation 640 the background may be considered acceptable and the background measurement 600 passes and moves on to whatever operation is next as indicated by line 660.

Figure 7:
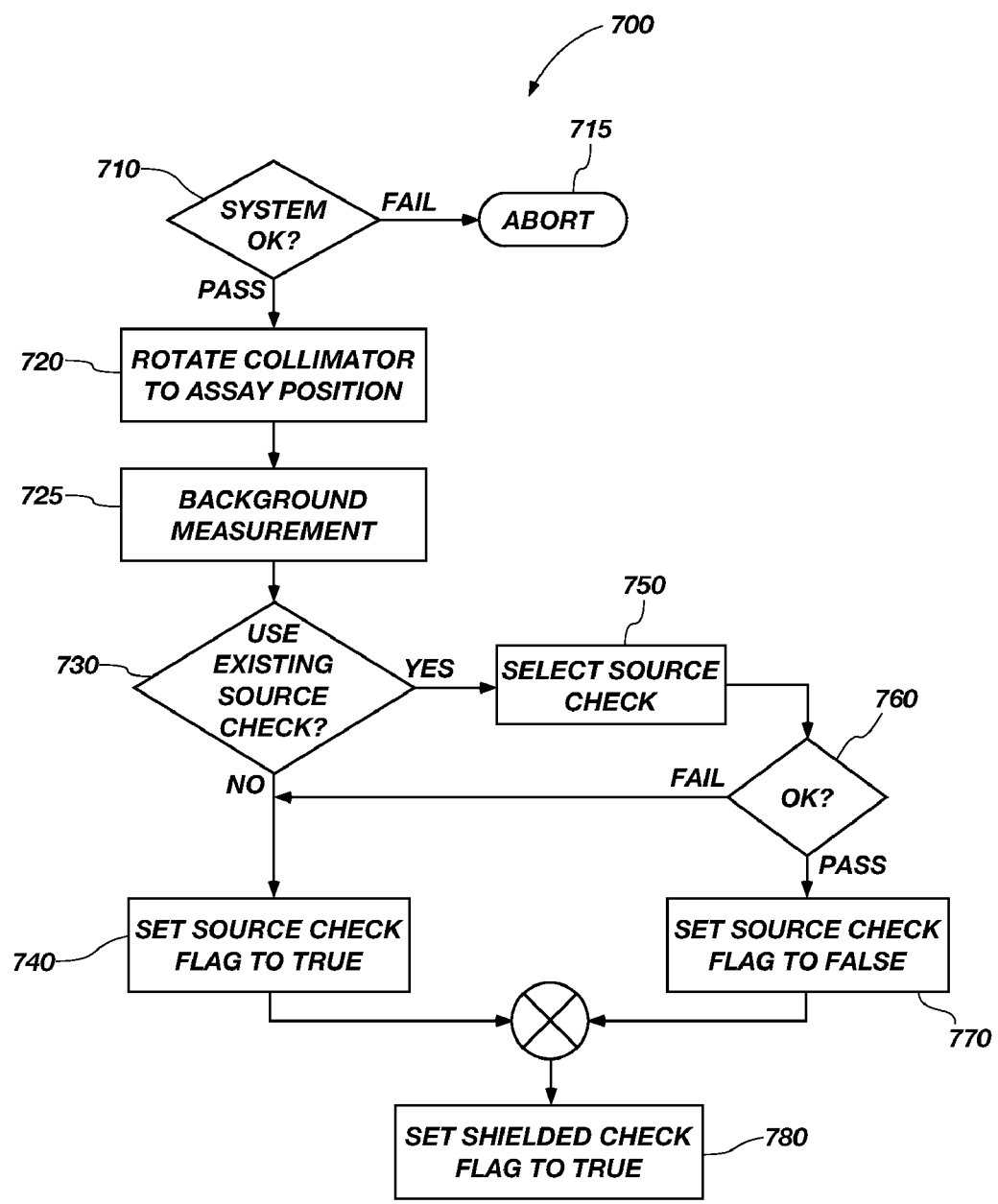
FIG. 7 is a flow chart representing an initial set-up process of a waste screening system according to an embodiment of the present invention.

FIG. 7 is a flow chart representing an initial set-up process 700 of a waste screening system according to an embodiment of the present invention. The initial set-up process 700 may be initiated by the waste screening system software as a startup sequence that is repeated every time the waste screening system software is launched.

At operation 710, a system check is performed, during which the software attempts to communicate with the hardware devices that are supposed to be connected to the system. Exemplary hardware devices may includes one or more radiation detectors, multichannel analyzers, cooling units, load cells, conveyor systems, as well as other hardware devices that may be desirable. A hardware check at operation 701 may further include the waste screening system software reading startup data files used to configure the system for a particular radiation detector.

If the waste screening system fails its initial system check, the operator may be advised of a system failure and the waste screening system may abort at operation 715 (i.e., stop operation), and require that the operator remedy the problem before further operations may be performed. If the hardware check at operation 710 does pass, then the initial set-up process 700 moves on to operation 720 in which the collimator may be rotated to the assay position for a background measurement of the environment at operation 725. The background measurement of operation 725 may be a simple characterization of the environment (e.g., surrounding waste pit) to ensure that the surrounding area is not in a highly contaminated state such that risk to human safety would be undesirably high. Further details of the background measurement of operation 725 may be similar to those described in reference to FIG. 6.

At operation 730, the system may give the operator an option to use existing calibration information already on record. For example, a source check may be required to be performed by the system at a minimum time interval to ensure that a recent source is on record. At operation 730, the operator may determine not to use an existing source check. The operator may decide not to use an existing source check if the operator is aware that an acceptable recent source check has been performed. The operator may also decide that a new source check is desirable even if not required to according to operating procedure. In such a situation, operation 740 is performed, the significance of which is described below.

If, however, the operator is aware of a source check that has been recently performed, the operator may determine that another source check is not necessary. In that situation, the operator may decide to use an existing source check at operation 730. At operation 750, the operator selects a source check file including source check information that has been stored from a previously performed source check. At operation 760, a determination is made whether the selected source check file is within the minimum time interval required by the system, and whether the file is operable. If a failure exists, then the system returns to operation 740. If a failure does not exist, then operation 780 is performed.

Figure 8:
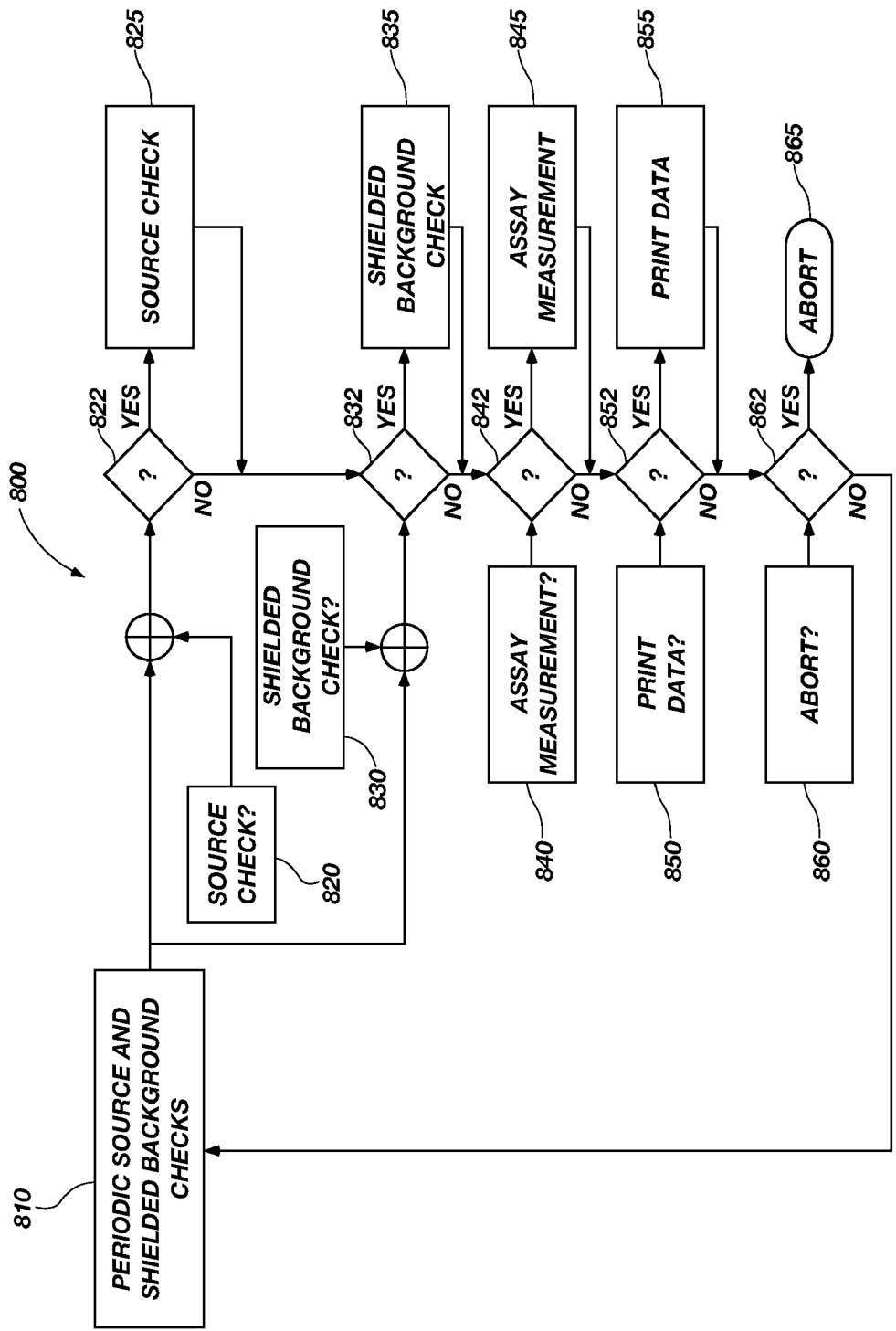
FIG. 8 is a flow chart representing operation of a main loop of a waste screening system according to an embodiment of the present invention.

At operation 740, a source check flag is set to "true." The source check flag being set to true may indicate that the source check function should be performed at the beginning of the main loop (FIG. 8, operations 822-825). At operation 780, the source check flag is set to "false." The source check flag being set to false may indicate that the existing source check is acceptable and that the source check function should not be performed at the beginning of the main loop (FIG. 8). At operation 790, the shielded background check flag may be set to "true." The shielded background check flag being set to true may indicate that the shielded background check function should be performed at the beginning of the main loop (FIG. 8, operations 832-835). If the initial set-up process is completed, the program may move onto the main loop (FIG. 8).

FIG. 8 is a flow chart representing the main loop 800 of a waste screening system according to an embodiment of the present invention. At operation 810, the code loop determines if a periodic source check or a periodic shielded background check is required. As described by operations 820-825 and 830-835, source checks and shielded background checks may be performed manually by an operator; however, it may be desirable for the waste screening system to perform a source check or a shielded background check at a minimum frequency in order to ensure that the background or the internal contamination have not changed significantly, which change could compromise the accuracy of the measurements. The waste screening system may include a running clock to determine the amount of time that has elapsed since the previous source check or shielded background check. For example, if a source check has not been performed (either manually, or being required to do so) for 12 hours, it may be desirable for the main loop 800 to require a source check. Likewise, if a shielded background check has not been performed for 24 hours, it may be desirable for the main loop 800 to require a shielded background check. Of course, the amounts of time described herein are used as examples, and may be variable and depend upon preference or other circumstances. If a periodic source check or shielded background check is required by operation 810, the appropriate flag is set to true. When a flag is set to true, the respective decisions at operations 822, 832 may determine that a source check at operation 825 or a shielded background check at operation 835 is to be performed.

The main loop 800 further includes operations that may be manually triggered by an operator. These manually-triggered operations are represented by Source Check? 820, Shielded Check? 830, Assay Measurement? 840, Print Data? 850, and ABORT? 860. If an operator selects one of these operations, the appropriate flag is set, which triggers the corresponding decision (i.e., 822, 832, 842, 852, 862) and calls the corresponding function (i.e., 825, 835, 845, 855). The processes for source check operation 825, shielded background check operation 835, and assay measurement operation 845 are described more fully below with reference to FIGS. 9, 10, and 11A-11C, respectively. The print data operation 855 obtains stored data from the waste screening system to be displayed and/or printed, and the ABORT operation 865 terminates the operation of the waste screening system.

While the waste screening system is idle (i.e., there are no assay measurements or other modes in process), the main loop 800 repeats indefinitely until a function is selected by an operator, a function is selected automatically from time triggers within the system, or a function is selected automatically through other triggers or interrupts within the system.

Figure 9:
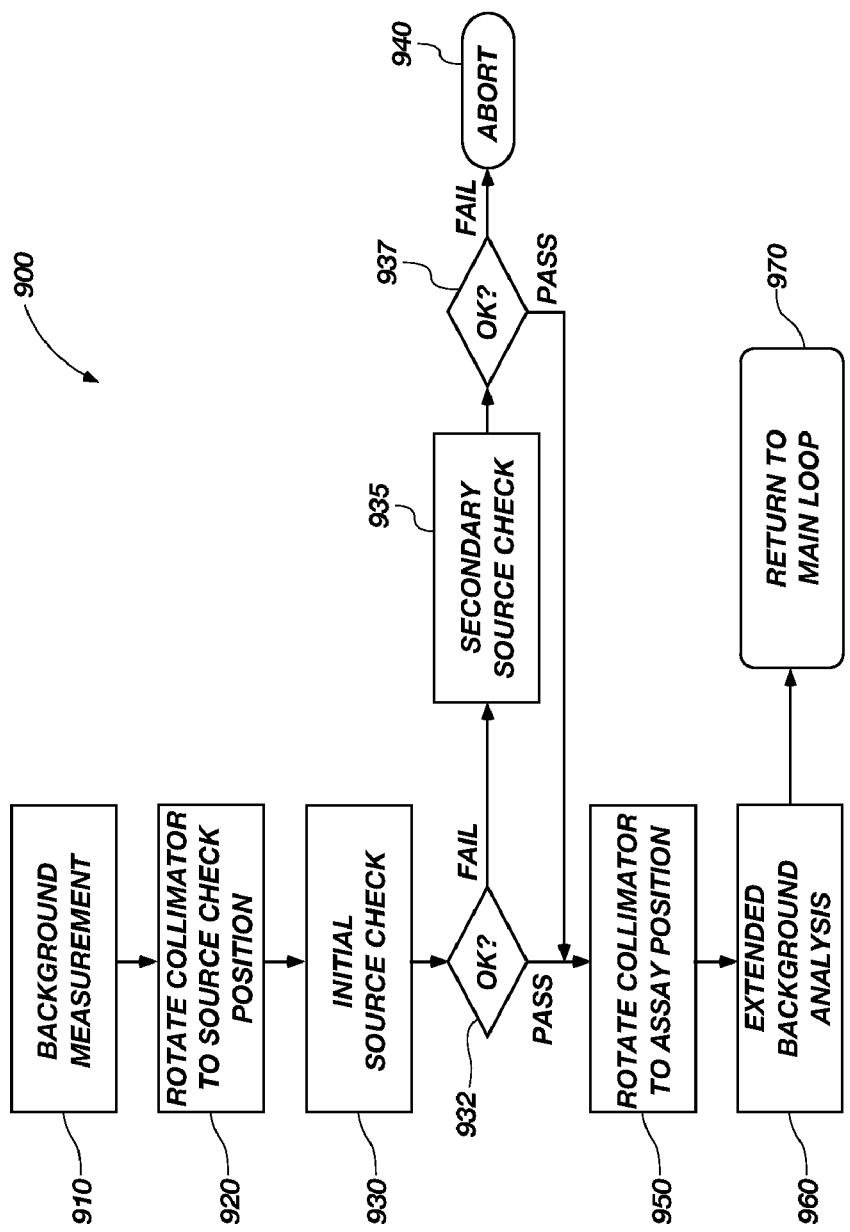
FIG. 9 is a flow chart representing a source check operation for a waste screening system according to an embodiment of the present invention.

FIG. 9 is a flow chart representing a source check 900 function for a waste screening system according to an embodiment of the present invention. The source check 900 serves to perform an energy calibration a radiation detector of a waste screening system with a known source (e.g., $^{152}$Eu), or to check the performance of certain hardware components (e.g., radiation detector, multichannel analyzer). Source check 900 may be performed as required by the waste screening system as a periodic source check (e.g., every 12 hours), or when selected manually by an operator. For example, a source check 900 should be performed when the waste screening system is suspected of needing calibration. At operation 910, a background measurement may be performed. The background measurement of operation 910 may be similar to that described in reference to FIG. 6.

At operation 920, the collimator may be rotated to the source check position. As previously described the collimator of a waste screening system may be rotatable to permit different functions being performed by the radiation detector. When rotated to the source check position, the collimator may shield the radiation detector from background activity and position a known source (e.g., $^{152}$Eu) within the field of view of the radiation detector. In other words, the aperture of the collimator may be shielded from the background. The known source may be isolated internally by the collimator to be detected by the radiation detector.

At operation 930, an initial source check may be performed on the isolated known source in the collimator. The system detects the radiation emitted by the known source for a given time (e.g., 5 minutes). The initial source check at operation 930 creates a spectrum and monitors the characteristic peaks generated by the known source, and performs an energy calibration based, at least in part, on those peaks. Such an energy calibration may ensure that the radiation detector remains within a desired tolerance level for the detected peaks of the known source compared with the characteristic peaks which are known to be generated by the known source. For example, an $^{152}$Eu source should generate about 12 characteristic peaks at known energy levels. The initial source check at operation 930 may compare one or more energy peak levels of the generated spectrum with the corresponding specific characteristic gamma ray lines expected to be generated. The initial source check 930 ensures that the compared energy peaks in the generated spectrum are properly positioned relative to each other in the spectrum and at the right energy levels. If there is a discrepancy between the generated spectrum and the characteristic spectrum for the known source, an adjustment may be made on the energy gain per channel of the multichannel analyzer used in creating the spectrum. In other words, the peaks in the generated energy spectrum may be forced to match the characteristic peaks for the spectrum of the known source.

The initial source check at operation 930 may also be used to monitor the shape of the energy peaks in the spectrum generated by the known source. If the energy peaks are determined to be misshaped (e.g., wider than normal) then the radiation detector may be declining in performance (e.g., resolution decreasing). Thus, the initial source check may perform an energy calibration as well as a check to determine if the radiation detector is failing. During source check, the waste screening system may also create a control chart storing the present data with historical data of prior source checks. If the activity detected during the present initial source check at operation 930 differs significantly from the historical data from prior source checks, the significant difference may indicate component failure. As a result, a failure may be determined at operation 932.

If the initial source check from operation 930 is determined to fail at operation 932, then a secondary source check at operation 935 may be performed. The secondary source check at operation 935 may perform similar functions in energy calibration and detector testing as initial source check at operation 930. The secondary source check 935 may take measurements of the known source for a longer duration in order to reduce the uncertainties in the measurements. If the secondary source check from operation 935 fails at operation

937, then the system may abort 940 and terminate until the problem is remedied. Because such a failure would likely be caused by a hardware failure, one or more hardware devices (e.g., radiation detector, multichannel analyzer, etc.) may be required to be replaced.

If either the initial source check from operation 930 or the secondary source check from operation 935 passes, the system may direct the collimator to be rotated to the assay measurement position at operation 950. While in the assay measurement position, the system may perform an extended background analysis at operation 960. The extended background analysis at operation 960 is distinguished from the background measurement described in reference to FIG. 6. In particular, the extended background analysis 960 is generally for a longer duration than the background measurement of FIG. 6. The extended background analysis at operation 960 is also performed for a different purpose than evaluating criticality of the environment or substantial changes of the environment surrounding the waste screening system.

For example, the extended background analysis at operation 960 may collect counts by the radiation detector from the background for a period of time sufficient to obtain suitable measurements of the background radiation. In other words, the extended background analysis at operation 960 may be a more fine measurement of the background than the background measurement of FIG. 6. The results of the extended background analysis at operation 960 may, therefore, be more reliable (i.e., less uncertainty in the measurement statistics) and the result data may be stored for later use. For example, during assay measurement and analysis, the result data from the extended background analysis at operation 960 may be subtracted from the gross data of the assay measurement to obtain net measurement data for the assay. At operation 980, the source check 900 function returns to the main loop (FIG. 8).

While an extended background measurement at operation 960 is described herein as being separate from a simple background measurement (e.g., 970 of FIG. 9 or FIG. 6), the two functions may be combined. Additionally, the extended background measurement at operation 960 is described as being performed each time a source check 900 function is performed. However, the background measurement of operation 960 may be performed or called as a separate function, or in combination with other functions which are described herein.

Figure 10:
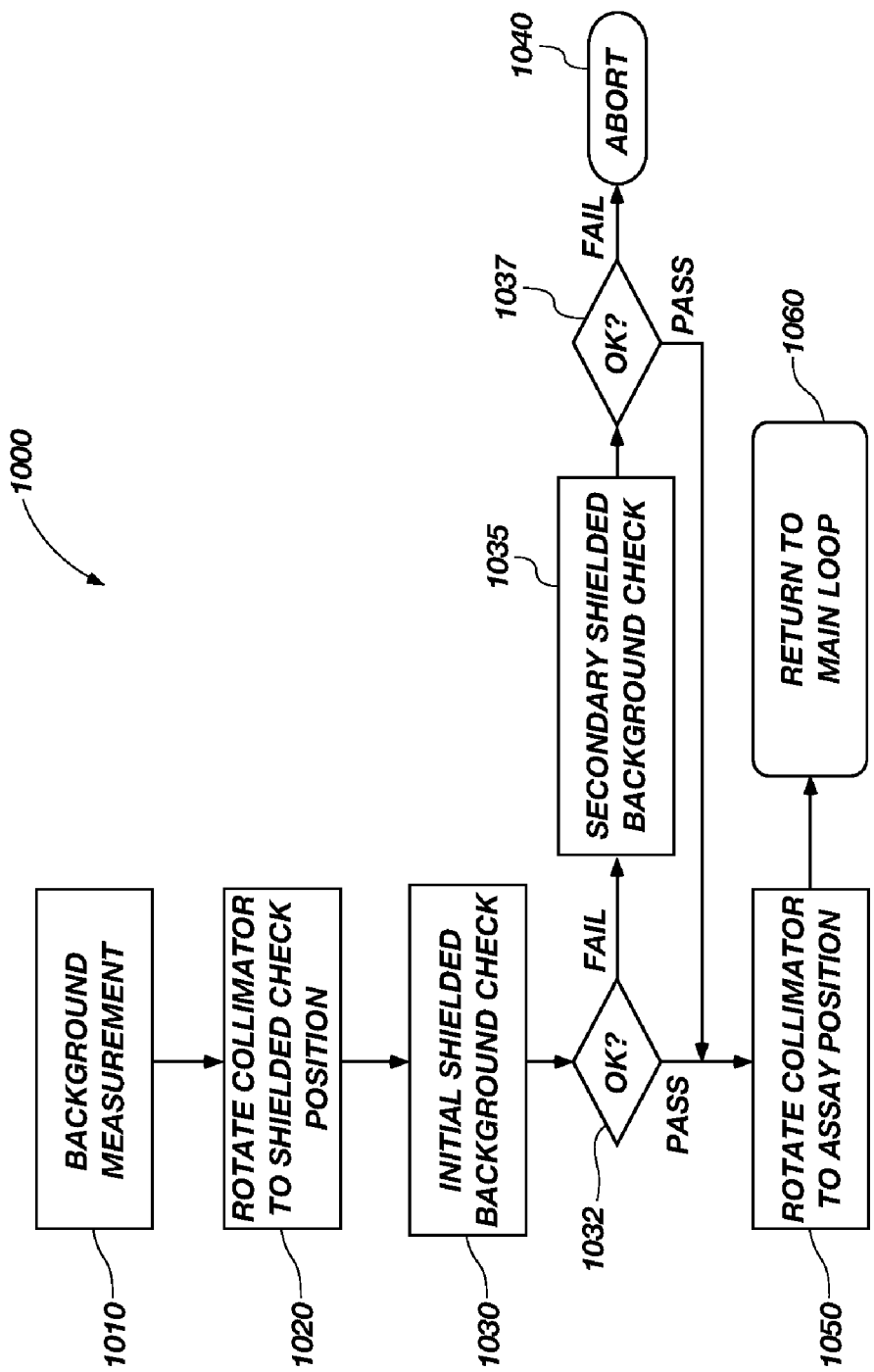
FIG. 10 is a flow chart representing a shielded background check function for a waste screening system according to an embodiment of the present invention.
Figure 11A:
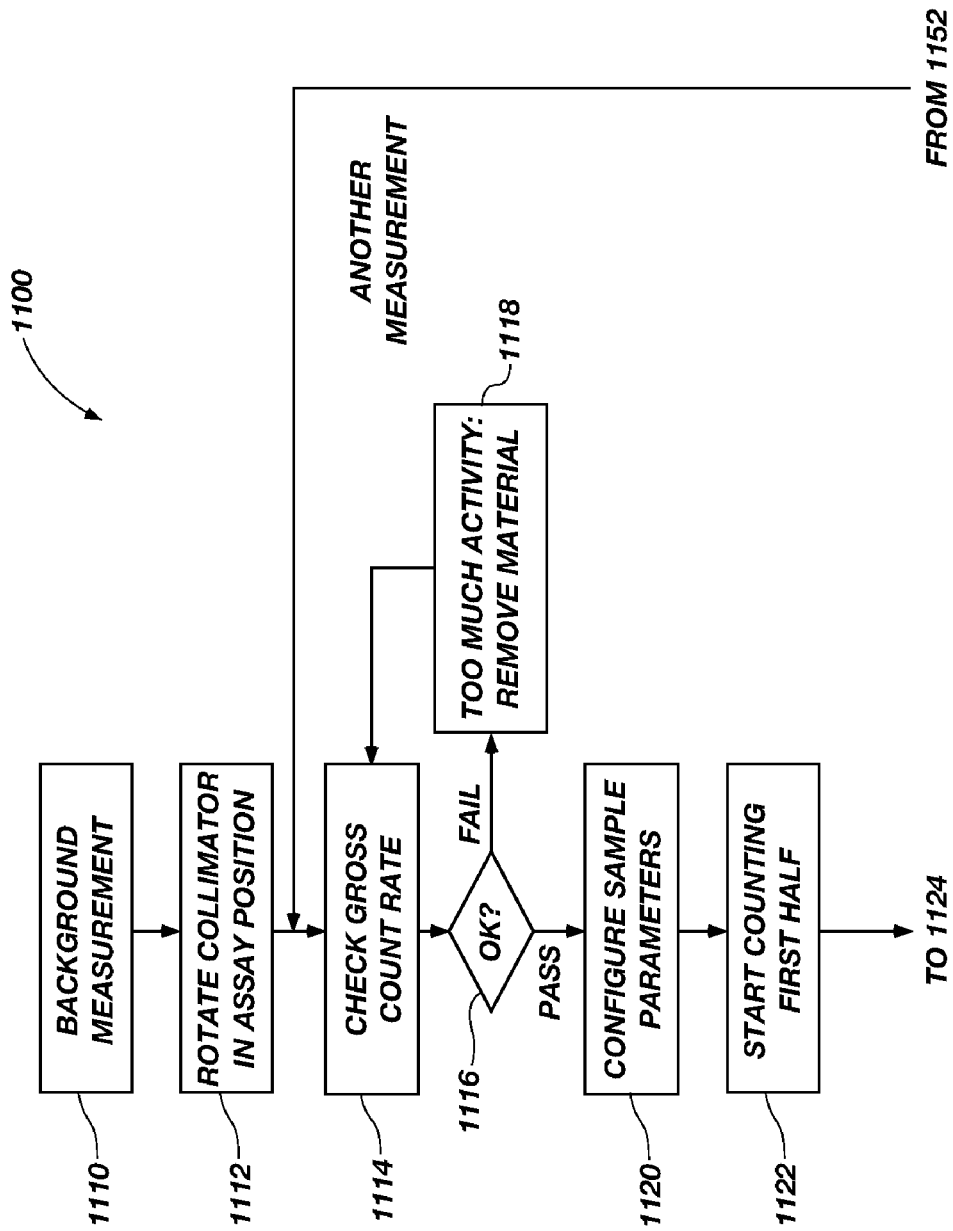
FIGS. 11A-11C are a series of flow charts representing an assay measurement function for a waste screening system according to an embodiment of the present invention.
Figure 11B:
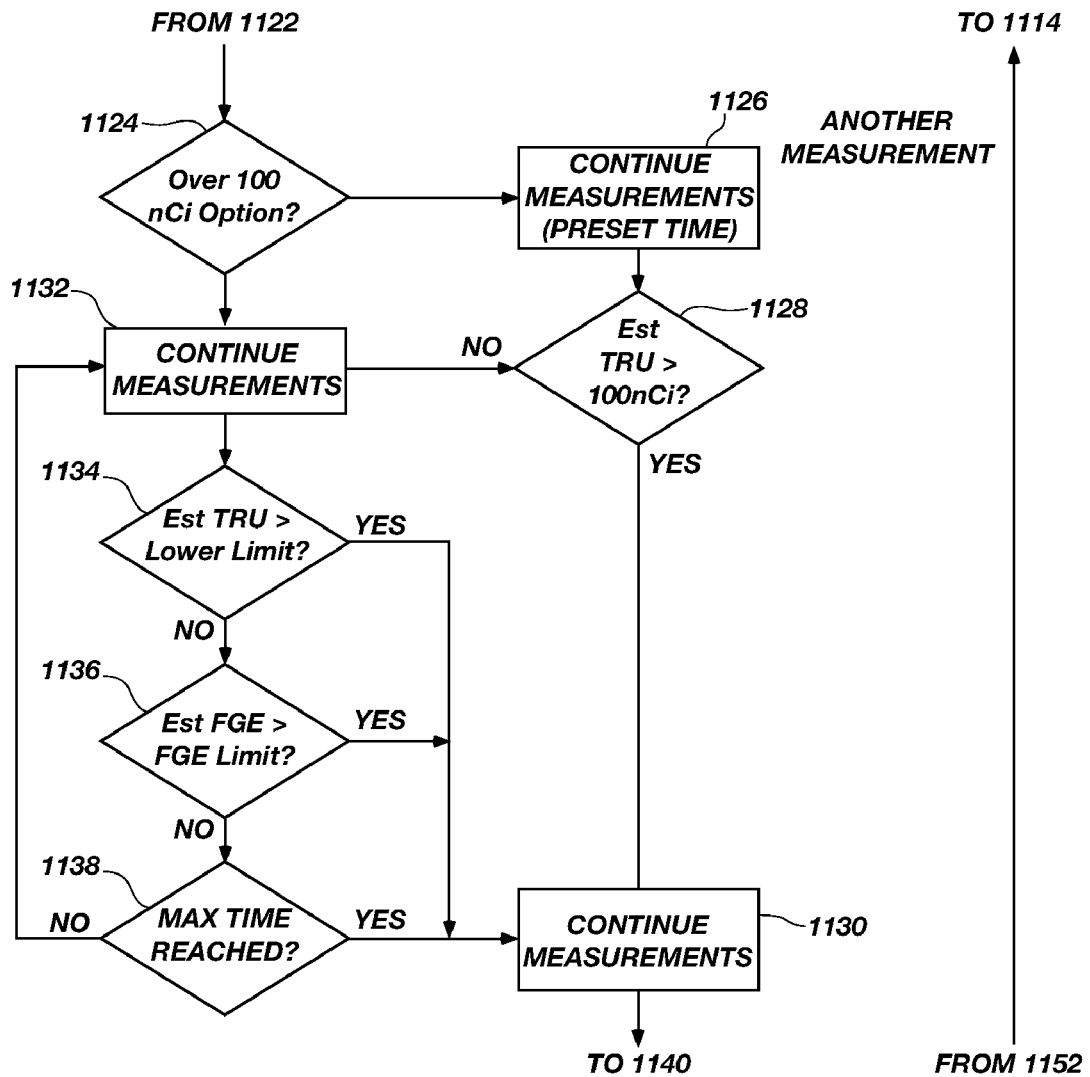
Figure 11C:
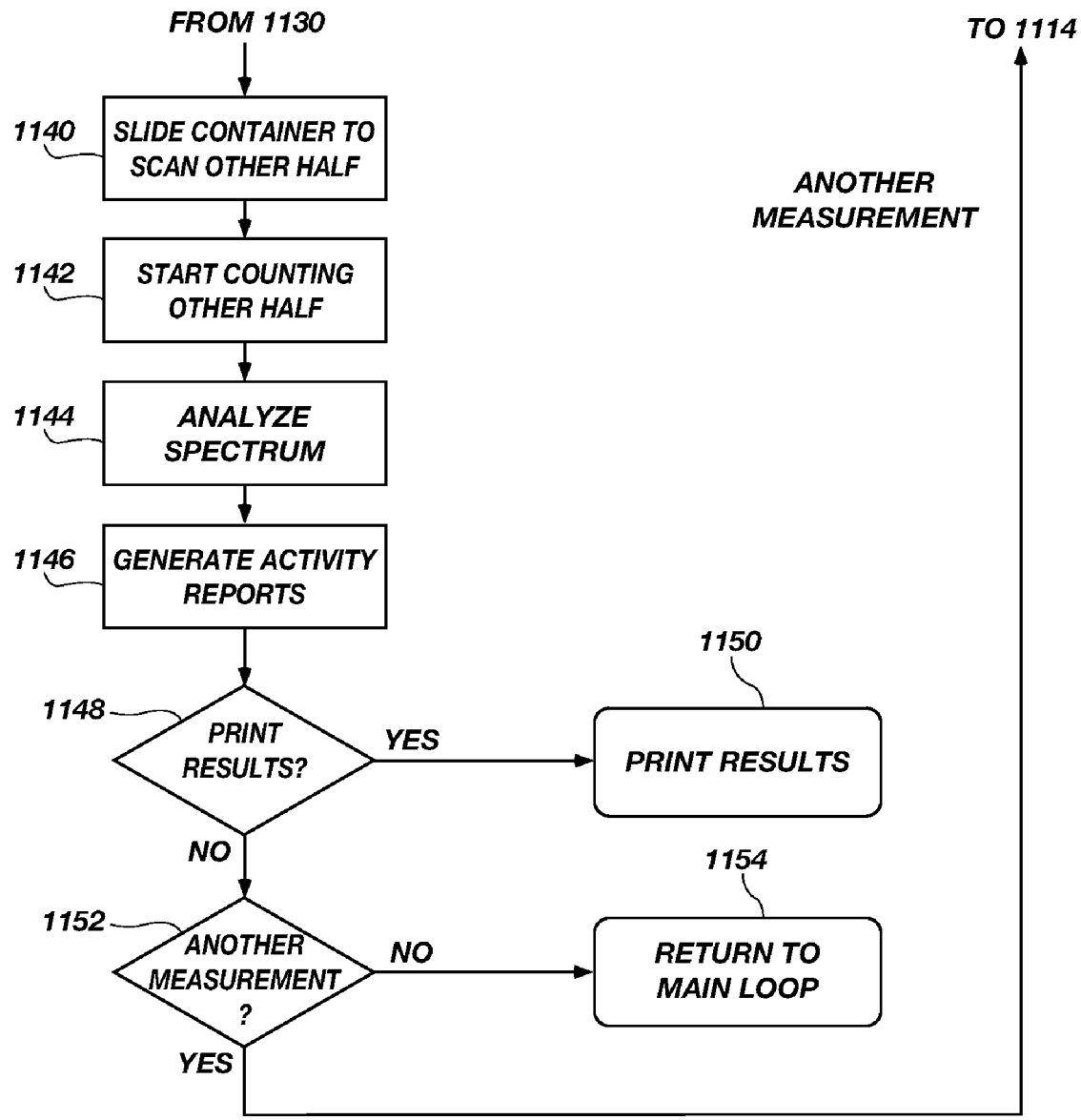

FIG. 10 is a flow chart representing a shielded background check 1000 function for a waste screening system according to an embodiment of the present invention. Shielded background check 1000 may also be referred to herein as a shielded background check because the function, the radiation detector is being shielded from the background (and also the assay) in order to perform a check on potential internal contamination of the radiation detector. Internal contamination may be a problem as such contamination may cause the radiation detector to experience artificially high readings. Shielded background check 1000 may be performed as required by the waste screening system as a periodic shielded background check (e.g., every 24 hours), or when selected manually by an operator. For example, a shielded background check 1000 should be done when portions of the waste screening assembly (e.g., collimator assembly, detector housing, or radiation detector) is suspected of experiencing contamination.

At operation 1010, a background measurement may be performed. Background measurement 1010 may be similar to that described in reference to FIG. 6.

At operation 1020, the collimator may be rotated to the shielded background check position. The shielded background check position may shield (i.e., block) the radiation detector's field of view as to external radiation sources (e.g., background radiation, assay, etc.) in order to ensure that radiation measurements detected by the radiation detector are a result of contamination within the radiation detector itself, or the detector chamber. It is noted that the collimator position of a shielded background check differs from a source check position of the collimator in that the source check position of the collimator shields the radiation detector, but also provides a known source within the collimator for the radiation detector to collect data to generate a spectrum related to the radiation from the known source.

At operation 1030, an initial shielded background check is performed. The initial shielded background check at operation 1030 may include collecting measurement data for an initial period of time (e.g., 60 seconds). During an initial background check of operation 1030, the waste screening system may also create a control chart storing the present data with historical data of prior shielded background checks. If the activity detected during the present initial shielded background check of operation 1030 differs a significant level above the historical data from prior shielded background checks, the significant difference may indicate internal contamination within the radiation detector has increased over time. As a result, a failure may be determined at operation 1032.

If the initial shielded background check from operation 1030 is determined to fail at operation 1032, then a secondary shielded background check at operation 1035 may be performed. The secondary shielded background check at operation 1035 may perform similar functions to determine internal contamination of the radiation detector as with the initial shielded background check at operation 1030. The secondary shielded background check at operation 1035 may collect measurements for a longer duration (e.g., 180 seconds) in order to reduce the uncertainties in the measurements. If the secondary shielded background check from operation 1035 fails at operation 1037, then the system may abort at operation 1040 and terminate until the problem is remedied. Because such a failure would likely be caused by internal contamination of the radiation detector, the radiation detector, collimator assembly, or both may be required to be cleaned, or in some cases replaced.

If either the initial shielded background check from operation 1030 or the secondary shielded background check from operation 1035 passes, and the collimator may be rotated at operation 1050 to the assay position in preparation of performing measurements. At operation 1060, the shielded background check 1000 returns to the main loop (FIG. 8). With a proper shielded background check 1000, and a proper source check (FIG. 9), the waste screening system may be ready to perform measurements.

FIGS. 11A-11C are a series of flow charts representing an assay measurement 1100 function for a waste screening system according to an embodiment of the present invention. The assay measurement 1100 serves to perform measurements from the radiation detector of a waste screening system to detect and characterize radioactive contents of a sample.

At operation 1110, a background measurement may be performed. The background measurement of operation 1110 may be similar to that described in reference to FIG. 6. At operation 1112, the collimator is rotated to the assay position. If the collimator is in the assay position, an aperture of the collimator aligns with the radiation detector to direct the field of view of the radiation detector to permit the radiation detector to detect the radioactivity of the sample and reduce or eliminate the effects of radioactivity from background sources (e.g., a nearby waste pit, other filled temporary waste containers awaiting screening, packaged waste, etc.).

At operation 1114, an initial gross count rate is checked. The gross count rate of operation 1114 may measure gross gamma activity to ensure that the sample in the temporary waste container is not undesirably hot from a radioactive standpoint. Being undesirably hot from a radioactive standpoint may cause one of many problems including being unsafe, providing inaccurate measurements, and ultimately exceeding an upper threshold for shipping and disposal. If the gross count rate from operation 1114 for the sample is above a predetermined threshold (e.g., 500,000 counts per second (cps)) and determined to be undesirably hot, a failure is determined at operation 1116 and at least a portion of sample in the temporary waste container may be removed at operation 1118 and the gross count rate of operation 1114 is repeated. In some cases, less radioactive samples may be mixed with a hot sample to lower the overall activity of the sample being measured.

If the gross count rate of operation 1114 is determined to be acceptable at operation 1116, further analysis may be performed. At operation 1120, sample parameters may be configured. Sample parameters may include information regarding the specific sample being measured, which may be retrieved automatically by the waste screening system, input by the operator, or a combination thereof. Such information may be used in the analysis of the radioactive content of the sample. Other information may simply be used for organizational and bookkeeping functions of the waste screening system. Exemplary sample parameters may include a temporary waste container ID, waste type (e.g., graphite, cloth rags, dirt, etc.), height of the sample within the temporary waste container, and weight of the filled temporary waste container. The weight and height of the sample may be used to calculate the density of the sample, which may be further used in calculating mass attenuation of the radiation of the sample.

At operation 1122, the first half of the waste container may be counted. As previously discussed, the collimator may be configured to direct a field of view that is smaller than the boundaries of a temporary waste container. As a result, more than one set of measurements may be taken. In this example, the field of view may be for approximately half of the temporary waste container, such that a measurement set may be obtained for the first half of the temporary waste container and the other half of the temporary waste container. More or fewer measurement sets may be obtained depending on the field of view provided by the collimator and the distance from the detector for the desired resolution of the detector.

As will shortly be discussed, different time periods may be used for obtaining measurements for the first half of the temporary waste tray. These different time periods may be determined by a relatively short preset time period (e.g., 15 seconds) for higher activity samples and a relatively long maximum time period (e.g., 90 seconds) for lower activity samples. Generally speaking, an extended period for measurement may provide more accurate data (i.e., reduced uncertainties), especially when making a determination at a lower threshold where activity is lower and uncertainties are higher. More accurate data (i.e., relatively low uncertainties) may be obtained more quickly with a warmer sample because there are more counts coming off the sample to reduce the error in the measurement.

The decision for shorter or longer measurement periods may be given to the operator at operation 1124. Permitting the operator to make such a decision may give the operator flexibility in making measurements and ultimately speed up the measurement process. For example, if the operator has been making a number of measurements of samples that originated from the same area of a waste pit, it may not be necessary to test the activity threshold for every sample. The sample from the same area of the waste pit may likely easily satisfy the activity threshold, while other layers of the waste pit (e.g., top of the pit or edges of the pit) may be such that exceeding the activity threshold may be in question. If the operator makes that determination, then a measurement for a longer duration may be taken at operation 1132. If, however, the operator decides (e.g., based, at least in part, on other measurements from the similar set of samples) that the measurements for the sample will at least meet the activity threshold, then measurements for a shorter duration 1126 may be performed. It is noted that while the sample parameters are being configured in operation 1120, some measurement data may be collected prior to the decision at operation 1124.

At operation 1124, a determination may be made by the operator whether or not to ensure that the sample of the radioactive waste is over an activity threshold (e.g., 100 nanocuries per gram (nCi/g)). 100 nCi/g is a common threshold for classifying transuranic waste; however, it is noted that 100 nCi/g is an exemplary threshold, and is not limited thereto. If the 100 nCi/g mode is selected by an operator, a shortened measurement period may be performed for a relatively short preset period of time (e.g., 15 seconds) at operation 1126. After the relatively short preset period of time, the measured TRU content is compared with a lower limit at operation 1128. If the measured TRU content is above the lower limit (taking into account uncertainties) after the relatively shortened preset time (e.g., 15 seconds) then the measurements may continue at operation 1130 for the other half of the temporary waste container. If the measured TRU content is below the lower limit (taking into account uncertainties) after the relatively shortened preset time (e.g., 15 seconds) then the measurements may continue at operation 1132 on the first half of the temporary waste container for a longer measurement period in order to reduce uncertainties for lower activity samples. In other words, if the measurements of the sample are not above the 100 nCi/g, then the measurements may be continued at operation 1132 for a longer duration in order to reduce the error as the uncertainties decrease as the time of counting is increased. In some cases, material from a different sample with a higher activity may be added to the material in the sample. In that situation, measurements may be re-taken at operation 1136 and a determination is made on whether the sample is above the lower limit with the additional materials added.

As an example, there may be a nominal number calculated for TRU content (e.g., 120 nCi/g after 15 seconds); however, the data may include uncertainty (e.g., 120+−60 nCi/g) such that a longer count time may be required to obtain more events to ensure that there truly is enough activity in the sample to satisfy the activity threshold. However, if a warmer sample may reach the lower limit (e.g., 140+−30 nCi/g) within a relatively short time period for measurements (e.g., 15 seconds), then the determination performed by operations 1126 and 1128 may reduce the amount of time needed to obtain sufficiently accurate data (i.e., data with reduced uncertainties).

If a relatively longer time period is desirable for more accurate measurements, then such measurements may be obtained at operation 1132. Operations 1134-1138 act as an "or" statement, in that if any one of the conditions for the decisions performed by operations 1134-1136 are true (i.e., yes) then the loop is exited and measurements continue at operation 1130 for the other half of temporary waste container. If the operations 1134-1138 are all false, then the measurements on the first half of temporary waste container continue at operation 1132.

At operation 1134, the TRU content is compared to a desired lower limit (e.g., 100 nCi/gram). The decision at operation 1134 may be enabled only when the 100 nCi/g option of operation 1124 was selected, otherwise operation 1134 may be skipped and only operations 1136 and 1136 are checked during the looped function. Alternatively, each of operations 1134-1138 may be performed during the looped function regardless of the 100 nCi/g option being selected in operation 1124.

At operation 1136, the FGE content is compared to an upper limit. FGE content may be calculated for the desired radionuclides, which may include the following: $^{241}$Am, $^{238}$Pu, $^{239}$Pu, $^{240}$Pu, $^{241}$Pu, $^{233}$U, $^{235}$U, and $^{237}$Np. For each radionuclide present in the sample, the waste screening system may ensure that the FGE is within a range between a lower limit (e.g., 100 grams) and an upper limit (e.g., 200 grams) for the sample to pass the screening to be sent on for packaging in a drum.

At operation 1138, when a maximum time has elapsed, the measurements of the first half of the temporary waste container may cease and measurements of the other half of the temporary waste container may begin at operation 1130. The maximum time may be an actual limit in seconds (e.g., 90 seconds) that measurements of a sample may be obtained regardless of the actual radioactive content determined in operations 1134 and 1136.

In other words, if an event (e.g., 1134, 1136) occurs prior to the maximum time period (e.g., 1138) elapsing, then measurements of the first half of the temporary waste container may cease. If no event occurs at operations 1134 and 1136, then the measurements of operation 1132 of the first half of the temporary waste container may continue in order to further reduce the uncertainties associated with the measurements and ensure that failure is due to the characteristics of the sample rather than uncertainty in the data. The measurements of the first half of the temporary waste container may continue at operation 1132 up until the maximum time has elapsed as determined by operation 1138. The values used for the comparison checks for operations 1132 and 1134 may be related to the determination of whether there is sufficient activity to obtain accurate measurements. These values may also be related to whether the sample meets the parameter limits for moving the sample to packaging, shipping and acceptance to a desired waste disposal site.

At operation 1130, a the measurements may continue for another portion of the temporary waste container, for example, when the field of view of the radiation detector is less than the full view of the temporary waste container. In the situation where the field of view of the radiation detector is approximately half of the boundaries of the temporary waste container, the temporary waste container may be positioned relative to the detector and collimator such that the other half of the sample in the temporary waste container is measured. A second set of measurements is obtained for the other portion of the temporary waste container as indicated by operation 1142.

The second set of measurements may be performed for a duration that is substantially the same, if not equal, to the total time for performing measurements on the first half of the temporary waste container. For example, if the activity of the temporary waste container is relatively high, then the measurements for the first half of the temporary waste container may be for a relatively short amount of time. For the 100 nCi option of operations 1124-1128, if an activity level of 100 nCi was measured within the 100 nCi preset period of time (e.g., 15 seconds) in operations 1126-1128, then the second set of measurements may be performed for the 100 nCi preset period of time (e.g., 15 seconds). Alternatively, if the activity of the temporary waste container is relatively low, then the measurements for the first half of the temporary waste container may be for a relatively long amount of time, such as the maximum time (e.g., 90 seconds) set by operation 1138. As a result, the second set of measurements may be performed for a duration that is also equal to the maximum time (e.g., 90 seconds) set by operation 1138. If, on the other hand, one of operations 1134, 1136 were to trigger at a time relatively shorter (e.g., 35 seconds) than the maximum time and relatively longer than the 100 nCi preset time, the second set of measurements may be performed for a duration that is equal to that time (e.g., 35 seconds). In other words, the total time for total measurements may be approximately double the amount of time for obtaining the first set of measurements, wherein the first and second sets of measurements may be combined to form a full measurement of the sample in the entire temporary waste container. Depending on the field of view permitted by the collimator, more or fewer sets of measurements may be similarly obtained and combined for a complete measurement of the temporary waste container.

As another embodiment, if one or more parameters measured with respect to the first portion of the temporary waste container fall sufficiently within a range between the upper limit and the lower limit, then operations 1140 and 1142 may be omitted to save time. For example, if the estimated FGE content for the tray at the first measurement location of the temporary waste container is securely within a range between the lower and upper limits of the parameters, the sample in the temporary waste container may be transferred immediately for packaging. If, however, the parameters of the first portion are not definitively measured within a range between the upper and lower limits, the operator may move the waste screening assembly to a second location of the temporary waste container to complete a full measurement of the sample.

At operation 1144, the measured data (i.e., spectrum) is analyzed. The analysis may employ a peak search engine, which may be available from ORTEC, that produces a report including peaks for a predetermined set of radionuclides. The counts for each of the peaks may be extracted from the measurements to estimate the overall activity for each radionuclide. The overall activity may be compensated for expected mass attenuation of the radiation within the sample.

For example, compensation for mass attenuation may be performed by automated density correction methods. Such density correction methods may correct for variable density and thickness in the sample being measured in order to compensate the overall activity for mass attenuation. An initial density correction method adjusts the measured activity based, at least in part, on thickness and density of the sample, and the expected mass attenuation for radiation for the characteristics of the material in the sample. For example, the adjusted activity may be determined by:

$$Act = \left(\frac{NCR}{Eff * BR * 3.7e7}\right) * \left(\frac{\mu \rho t}{1 - e^{-\mu \rho t}}\right) \quad (1)$$

where,
Act=Activity in millicuries;
NCR=Net corrected count rate (counts/second);
Eff=Interpolated detector efficiency;

BR=Branching ratio of the particular gamma ray line;
μ=Interpolated mass attenuation coefficient;
ρ=Density (gr/cm³) from weight and volume estimation; and
t=Thickness (cm) of sample.

A secondary density correction method may be performed after the initial density correction method. The secondary density correction method may correct for errors in the apparent mass attenuation coefficients used on the initial density correction shown as equation (1). The secondary density correction method may be performed by plotting the initial adjusted activity (Act) from equation (1) as a function of the inverse energy at which the activity was calculated, and performing a weighted least squares regression analysis to determine activity at infinite energy (i.e., assuming there are no mass attenuation effects) and the associated uncertainty at this energy. The basis of this secondary density correction method is that if the mass attenuation coefficients used in the initial calculation in equation (1) were correct, the slope of a line plotted through the data would be approximately zero as each gamma ray line for a particular isotope (e.g., $^{241}$Am) would provide substantially the same activity. A line resulting from the weighted least squares regression analysis with a negative slope indicates that the original mass attenuation coefficient (μ) used in equation (1) was too small. A line resulting from the weighted least squares regression analysis with a positive slope indicates that the original mass attenuation coefficient (μ) used in equation (1) was too large.

Each data point used in the analysis has a computed activity and associated uncertainty due to counting statistics. These numbers are corrected for efficiency and an initial mass attenuation correction using equation 1. In general, the uncertainty of each data point is unique lending itself to a weighted linear regression analysis for compensating for mass attenuation. For example, let $$w_i = \frac{1}{\sigma_i^2},$$

where $w_i$ is defined as a weighting function and $\sigma_i$ represents the count rate standard deviation associated with each nuclide. The weighting function may give more importance (i.e., weight) to measurement data that has relatively smaller counting errors. The slope and y-intercept of a regression line that minimizes the weighted sum of the errors squared are given by equations (2) and (3).

$$m = \frac{\sum_{i=1}^{n} w_i \sum_{i=1}^{n} w_i x_i y_i - \sum_{i=1}^{n} w_i x_i \sum_{i=1}^{n} w_i y_i}{\sum_{i=1}^{n} w_i \sum_{i=1}^{n} w_i x_i^2 - \left(\sum_{i=1}^{n} w_i x_i\right)^2} \qquad (2)$$

$$b = \sum_{i=1}^{n} w_i y_i - m \sum_{i=1}^{n} w_i x_i \qquad (3)$$

where,
m=Slope from the weighted regression analysis;
$x_i$=Inverse energy (1/E) in keV$^{-1}$ for measurement data;
$y_i$=Activity in mCi (from equation (1));
n=Number of data points in the analysis;
b=Y-intercept from the weighted regression analysis;
ρ=Density (gr/cm³) from weight and volume estimation; and
t=Thickness (cm) of sample.

In other words, the slope of the weighted linear regression analysis may indicate whether the initial mass attenuation assumptions were correct, and the y-intercept from the linear regression analysis may indicate the corrected value for the activity as if there were relatively little to no mass attenuation present gamma ray lines for each radionuclide present in the sample. The initial and secondary density corrections may be performed sequentially for the gamma ray lines for each radionuclide present within the sample. These adjusted values for activity may be stored and used for the gross results and net results for the measurement data. As a result of the automated data measurement, error models, and data analysis including adjustments for non-homogonous density, thickness, and mass attenuation, extensive technical review of the measurement data by technicians may be reduced or eliminated.

At operation 1146, the activity reports may be generated. Such activity reports may include gross results and net results of the measurement data. The gross results and net results may include the compensation for mass attenuation and variations in thickness and density as described in operation 1144. The gross results include the measurements collected for the sample by the radiation detector without the peak data from the extended background check being subtracted. The overall measured activity may also generate net results. The net results are determined taking the peak counts measured in the sample of the present temporary waste container and subtracting the background spectrum (FIG. 9, operation 960). The net results may be obtained for each gamma ray line in the measurement spectrum and the background spectrum. In other words, the portion of the measurement spectrum attributed to background contamination detected by the radiation detector is effectively negated.

The net results may be displayed to a monitor, printed, or both. For example, if the operator chooses to print the results of the activity reports, the results may be printed or otherwise reproduced at operation 1150. The reproduced results may include a summary of calculated activities for each radionuclide that was evaluated. For example, calculated parameters may be shown for $^{241}$Am, $^{239}$Pu, $^{238}$Pu, $^{240}$Pu, $^{241}$Pu, $^{242}$Pu, $^{233}$U, $^{235}$U, $^{238}$U, $^{237}$Np, $^{60}$CO$_5$ $^{137}$Cs, and $^{152}$Eu. For example, total activity, FGE, PEC, and TRU content may be provided, including uncertainties. From the reports generated and displayed in operations 1146 and 1148, an operator may also visually see whether the sample falls within a range between the lower and upper limits for the desired parameters and take the proper actions accordingly.

At operation 1152, the operator may make a decision whether or not to perform another measurement of a different sample. If another measurement is desired, the temporary waste container is removed and replaced with a new temporary waste container with new materials therein to sample, and the assay measurement 1100 returns to operation 1114 to check the gross count rate of the new sample. If a new measurement is not desired, the assay measurement 1100 may return to the main loop (FIG. 8) in operation 1154.

While the invention is susceptible to various modifications and implementation in alternative forms, specific embodiments have been shown by way of non-limiting example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. An apparatus for screening radioactive waste, comprising:
   a radiation detector configured for detecting radioactivity of a sample of radioactive waste prior to packaging thereof for disposal and generating measurement data in response thereto;
   a collimator assembly including at least one aperture configured to direct a field of view of the radiation detector;
   a computer assembly operably coupled with the radiation detector, and configured to receive measurement data from the radiation detector;
   control logic in communication with the computer assembly, the control logic configured to;
      calculate one or more parameters from the received measurement data comprising;
         calculating an initial activity of the received measurement data compensating for mass attenuation using one or more factors comprising the measured weight and the measured height of the sample;
         performing a weighted least squares regression analysis to determine activity at infinite energy on the calculated initial activity as a function of inverse energy at which the activity was calculated; and
         adjusting the mass attenuation coefficients based upon the slope of the weighted least squares regression analysis;
         calculating a corrected activity of the measured content compensating for mass attenuation using one or more factors comprising the measured weight and the measured height of the sample and any adjusted mass attenuation coefficients; and
         ensuring that the calculated corrected activity is at least-a predetermined lower limit,
   a support structure configured to receive a temporary waste container containing the sample;
   the support structure including a weight measurement device;
   a height measurement device in communication with the sample; and
   the radiation detector and collimator oriented such that the field of view of the radiation detector extends from the radiation detector in a vertical direction.

2. The apparatus of claim 1, wherein the collimator includes a rotatable portion, wherein the rotatable portion is configured to position the collimator with respect to the radiation detector in positions respectively associated with a plurality of modes of operation performed by the apparatus.

3. The apparatus of claim 2, wherein the control logic is configured for operating the apparatus in the plurality of modes of operation.

4. The apparatus of claim 3, wherein the plurality of modes of operation includes an assay measurement mode for measuring the radioactivity within the field of view of the radiation detector when the at least one aperture of the collimator is aligned with the radiation detector.

5. The apparatus of claim 3, wherein the plurality of modes of operation includes a source check mode configured for performing an energy calibration of the radiation detector with a known radioactive source wherein the collimator is positioned for exposing the radiation detector to the known radioactive source and for shielding the radiation detector from radiation external to the radiation detector and collimator.

6. The apparatus of claim 3, wherein the plurality of modes of operation includes a shielded background check mode configured for detecting internal contamination of the radiation detector, wherein the collimator is positioned for shielding the radiation detector from radiation external to the radiation detector and collimator.

7. The apparatus of claim 1, wherein the radiation detector comprises a germanium detector.

8. The apparatus of claim 1, wherein the control logic includes a graphical user interface configured for an operator to control functions of the apparatus.

9. The apparatus of claim 1, wherein the at least one calculated parameter is selected from the group consisting of $^{239}$Pu fissile gram equivalent, plutonium equivalent curies, and transuranic content.

10. The apparatus of claim 9, wherein the at least one calculated parameter is measured for radionuclides selected from the group consisting of $^{241}$Am, $^{238}$Pu, $^{239}$Pu, $^{240}$Pu, $^{241}$Pu, $^{242}$Pu, $^{233}$U, $^{235}$U, $^{238}$U, $^{237}$Np, $^{60}$Co, $^{137}$CS, and $^{152}$Eu.

11. A method for screening radioactive waste, the method comprising:
   providing a container comprising a first opening and containing a sample;
   measuring the weight of the sample;
   measuring the height of the sample;
   positioning the sample vertically aligned with a radiation detector; the first opening of the container positioned directly under the radiation detector;
   measuring a radioactive content of at least a portion of the sample using the radiation detector and a collimator;
   cooling the radiation detector;
   calculating by a processor one or more parameters from the measured radioactive content comprising:
      calculating an initial activity of the measured content compensating for mass attenuation using one or more factors comprising the measured weight and the measured height of the sample;
      performing a weighted least squares regression analysis to determine activity at infinite energy on the calculated initial activity as a function of inverse energy at which the activity was calculated; and
      adjusting the mass attenuation coefficients based upon the slope of the weighted least squares regression analysis; and
      calculating a corrected activity of the measured content compensating for mass attenuation using one or more factors comprising the measured weight and the measured height of the sample and any adjusted mass attenuation coefficients;
   a. ensuring that the calculated corrected activity is at least a predetermined lower limit.

12. The method of claim 11, wherein the one or more parameters includes at least one of a fissile gram equivalent of the sample, a transuranic waste content of the sample and a plutonium equivalent curies calculation of the sample; and
   further comprising ensuring that at least one of the one or more parameters falls between a predetermined upper limit and a predetermine lower limit.

13. The method of claim 1, wherein the one or more parameters includes measurements for radionuclides selected from the group consisting of $^{241}$Am, $^{238}$Pu, $^{239}$Pu, $^{240}$Pu, $^{241}$Pu, $^{242}$Pu, $^{233}$U, $^{235}$U, $^{238}$U, $^{237}$Np, $^{60}$Co, $^{137}$CS, and $^{152}$Eu.

14. The method of claim 11, wherein measuring a radioactive content of the sample includes continuing measurements for a longer duration if a value of the one or more parameters minus a predetermined uncertainty is below a predetermined threshold.

15. The method of claim 14, wherein continuing measurements for a longer duration continues until an error margin is reduced below a predetermined threshold.

16. The method of claim 11, wherein measuring a radioactive content of the sample is performed in a plurality of measurements on a plurality of portions of the sample.

17. The method of claim 11, further comprising calculating background radiation with the sample not being present and subtracting the background radiation from the measured radioactive content of the sample.

18. The method of claim 11, further comprising measuring internal contamination of the radiation detector while the radiation detector is shielded from the sample.

19. The method of claim 11, further comprising calibrating the radiation detector while the radiation detector is shielded from the sample and exposed to a known radioactive source.

20. The apparatus of claim 1, wherein:
the collimator is configured to view one half of the sample.

21. The method of claim 11, wherein:
measuring a radioactive content of the sample is performed in a plurality of measurements on a plurality of portions of the sample; and further comprising
adding radioactive waste if a value of calculated adjusted activity minus a predetermined uncertainty is below a predetermined threshold.

22. The method of claim 21, further comprising calculating background radiation with the sample not being present and subtracting the background radiation from the measured radioactive content of the sample.

23. The method of claim 22, wherein:
the step of measuring a radioactive content of the sample is performed by a first measurement measuring a first half of the sample and a second measurement measuring a second half of the sample.

24. The method of claim 23, further comprising:
before the step of measuring a radioactive content of the sample, positioning the interior of the container about 18 inches from the collimator; and further comprising:
ensuring that samples having an estimated fissile gram equivalent below a predetermined content of $^{239}$Pu.

25. The method of claim 24, wherein measuring a radioactive content of the sample includes continuing measurements for a longer duration if the calculated initial activity minus a predetermined uncertainty is below a predetermined threshold.

26. The method of claim 25, whereby the step of measuring the weight of the sample and the step of measuring a radioactive content of the sample are all performed using the same support structure.

* * * * *